US011006373B2

(12) United States Patent
Han et al.

(10) Patent No.: US 11,006,373 B2
(45) Date of Patent: May 11, 2021

(54) SCHEDULING TRANSMISSIONS BASED ON USER EQUIPMENT ENERGY REPORTING

(71) Applicant: QUALCOMM Incorporated, San Diego, CA (US)

(72) Inventors: Junsheng Han, Sunnyvale, CA (US); Raghu Narayan Challa, San Diego, CA (US); Timo Ville Vintola, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/596,618

(22) Filed: Oct. 8, 2019

(65) Prior Publication Data

US 2020/0112927 A1 Apr. 9, 2020

Related U.S. Application Data

(60) Provisional application No. 62/743,441, filed on Oct. 9, 2018.

(51) Int. Cl.
*H04W 52/36* (2009.01)
*H04W 72/12* (2009.01)

(52) U.S. Cl.
CPC ..... *H04W 52/365* (2013.01); *H04W 72/1205* (2013.01)

(58) Field of Classification Search
CPC ............. H04W 52/242; H04W 52/365; H04W 52/367; H04W 72/1205; H04W 72/1242

USPC ........................................................ 455/522
See application file for complete search history.

(56) References Cited

U.S. PATENT DOCUMENTS 6,615,026 B1 * 9/2003 Wong ..................... H01Q 1/245
                                                                  174/350
2018/0167897 A1 * 6/2018 Sampath ............. H04W 52/365

FOREIGN PATENT DOCUMENTS

WO       2012061582 A1      5/2012

OTHER PUBLICATIONS

International Search Report and Written Opinion—PCT/US2019/055420—ISA/EPO—dated Jan. 24, 2020.

* cited by examiner

*Primary Examiner* — Philip Sobutka
(74) *Attorney, Agent, or Firm* — Arent Fox LLP

(57) ABSTRACT

A user equipment (UE) may determine an amount of energy with which the UE is able to transmit in a first network. The UE may send, to a base station, information indicating the determined amount of energy. The UE may receive, from the base station, scheduling information based on the information indicating the determined amount of energy. The base station may receive, from the UE, the information indicating the amount of energy with which the UE is able to transmit in a first network. The base station may determine scheduling information based on the information indicating the amount of energy with which the UE is able to transmit in the first network, and the scheduling information may prevent the UE from exceeding a threshold amount of energy for a time period. The base station may send, to the UE, information indicating the scheduling information.

56 Claims, 11 Drawing Sheets

606 — Determine scheduling information based on the information indicating the amount of energy with which the UE is able to transmit in the 1st network

702 — Determine at least one of an uplink schedule for transmission by the UE or a downlink schedule for reception by the UE

704 — Determine a prioritization between a first type of traffic to be transmitted by the UE and a second type of traffic to be transmitted by the UE

706 — Determine a prioritization between control information to be transmitted by the UE and data information to be transmitted by the UE

708 — Determine to switch the UE to a bearer associated with a second network that is different from the first network

FIG. 7

SCHEDULING TRANSMISSIONS BASED ON USER EQUIPMENT ENERGY REPORTING

CROSS REFERENCE TO RELATED APPLICATION(S)

This application claims the benefit of U.S. Provisional Application Ser. No. 62/743,441, entitled "SYSTEM AND METHOD FOR REPORTING ENERGY RELATED TO TRANSMISSION" and filed on Oct. 9, 2018, which is expressly incorporated by reference herein in its entirety.

BACKGROUND

Technical Field

The present disclosure relates generally to communications systems, and more particularly, managing an amount of energy with which a user equipment may transmit in a radio access network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may emit radio waves and/or microwaves, particularly when the UE is transmitting because radio frequency (RF) waves may be emitted by an antenna of the UE. RF emissions have to potential to rapidly heat biological tissue (e.g., a body of a user). The biological effects caused by heating biological tissue via RF energy may also be known as "thermal" effects.

Transmission by a UE may increase RF emission. Furthermore, a housing of the UE may increase in temperature as one or more components disposed within the UE housing increase in temperature. When the UE is contacting the body of a user, or the UE is sufficiently proximate to the body of the user (e.g., less than twelve inches, less than five inches, or another distance at which thermal effects may still cause biological tissue to sufficiently increase in temperature), the user potentially may experience adverse effect(s) due the increased temperature of the UE and/or RF emissions (e.g., thermal effects). Consequently, excessive transmission by the UE may lead to injury or other negative health consequences due to the thermal effects.

In order to reduce the possibility of injury and/or other adverse health effects that a user may experience, approaches to reducing the thermal effects caused by a UE may be beneficial. The present disclosure describes various approaches to managing thermal effects of a UE, which may thereby reduce or mitigate the aforementioned thermal effects and/or other health consequences that may otherwise be commensurate with UE use.

In an aspect of the disclosure, a method for a UE, a computer-readable medium for a UE, and a UE are provided. The UE may be configured to determine an amount of energy with which the UE is able to transmit in a first network. The UE may be further configured to send, to a base station, information indicating the determined amount of energy. The UE may be further configured to receive, from the base station, scheduling information based on the information indicating the determined amount of energy.

In an aspect of the disclosure, a method for a base station, a computer-readable medium for a base station, and a base station are provided. The base station may be configured to receive, from the UE, information indicating an amount of energy with which the UE is able to transmit in a first network. The base station may be further configured to determine scheduling information based on the information indicating the amount of energy with which the UE is able to transmit in the first network, and the scheduling information may prevent the UE from exceeding a threshold amount of energy for a time period. The base station may be further configured to send, to the UE, information indicating the scheduling information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart of a method of wireless communication.

DETAILED DESCRIPTION

Figure 1:
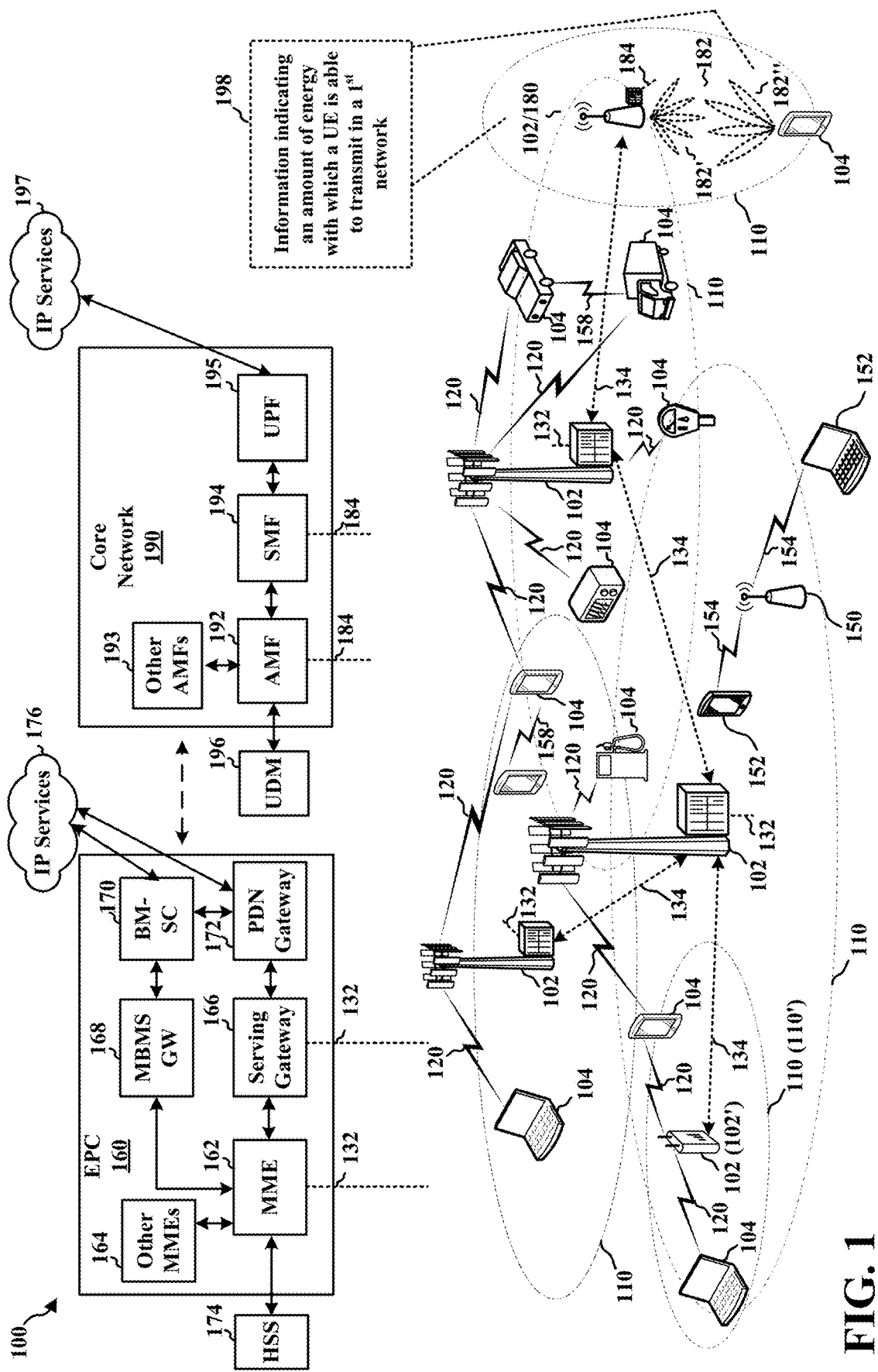
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), and/or other wireless and/or radio access technologies.

Referring again to FIG. 1, in certain aspects, the UE 104 may be configured to determine an amount of energy with which the UE is able to transmit in a first network. The UE 104 may be further configured to send, to a base station 102/gNB 180, information indicating the determined amount of energy (198). The UE 104 may be further configured to receive, from the base station 102/gNB 180, scheduling information based on the information indicating the determined amount of energy.

The base station 102/gNB 180 may be configured to receive, from the UE 104, information indicating an amount of energy with which the UE 104 is able to transmit in a first network (198). The base station 102/gNB 180 may be further configured to determine scheduling information based on the information indicating the amount of energy with which the UE 104 is able to transmit in the first network. The base station 102/gNB 180 may determine the scheduling information to prevent the UE 104 from exceeding a threshold amount of energy for a time period. The base station 102/gNB 180 may be further configured to send, to the UE 104, information indicating the scheduling information.

The UE 104 may receive the scheduling information, which may be associated with uplink transmission from the UE 104 to the base station 102/gNB 180 (potentially, the scheduling information may also be associated with downlink transmission to the UE 104 from the base station 102/gNB 180). Accordingly, the UE 104 may determine a schedule (e.g., a set of time and/or frequency resources) for communication with the base station 102/gNB 180 based on the received scheduling information. For example, the UE 104 may determine a schedule on which the UE 104 is to transmit uplink transmissions to the base station 102/gNB 180 based on the received scheduling information (potentially, the UE 104 may further determine a schedule on which the UE 104 is to receive downlink transmissions from the base station 102/gNB 180).

Correspondingly, the base station 102/gNB 180 may communicate with the UE 104 based on the scheduling information. For example, the base station 102/gNB 180 may receive uplink transmissions from the UE 104 based on the scheduling information (potentially, the base station 102/gNB 180 may further transmit downlink transmissions to the UE 104 based on the scheduling information).

Figure 2:
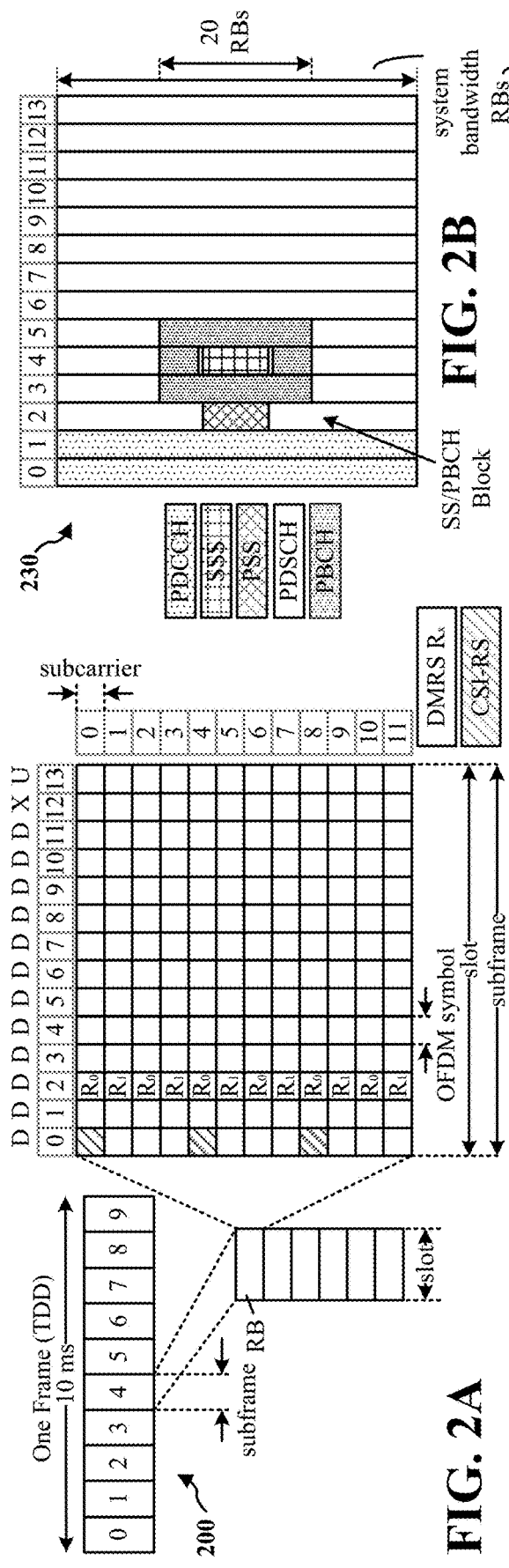
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
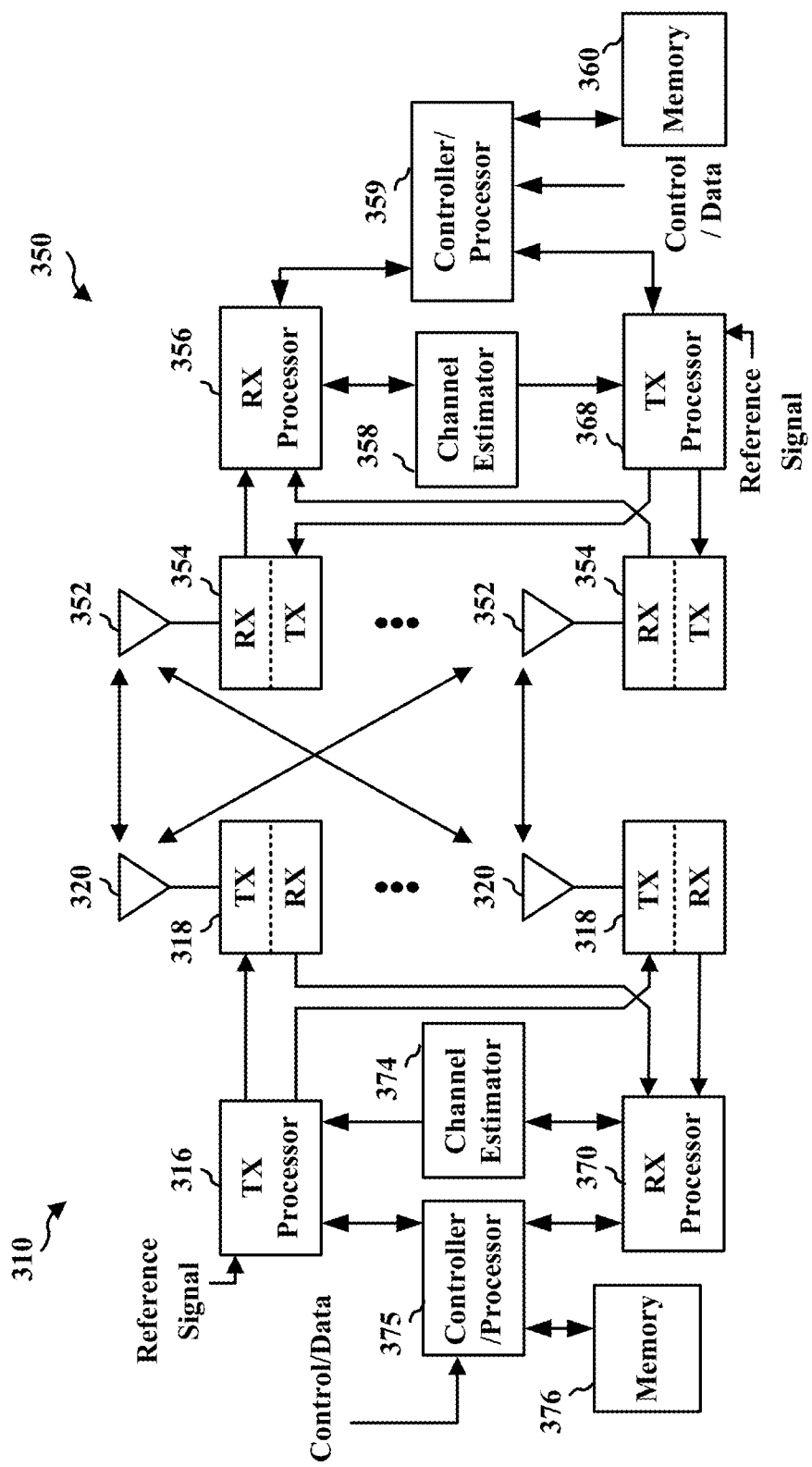
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with 198 of FIG. 1. In some other aspects, at least one of the TX processor 316, the RX processor 370, and the controller/processor 375 may be configured to perform aspects in connection with 198 of FIG. 1.

A UE may emit radio waves and/or microwaves, particularly when the UE is transmitting because radio frequency (RF) waves may be emitted by an antenna of the UE. RF emissions have to potential to rapidly heat biological tissue (e.g., a body of a user). The biological effects caused by heating biological tissue via RF energy may also be known as "thermal" effects.

Transmission by a UE may increase RF emission. Furthermore, a housing of the UE may increase in temperature as one or more components disposed within the UE housing increase in temperature. When the UE is contacting the body of a user, or the UE is sufficiently proximate to the body of the user (e.g., less than twelve inches, less than five inches, or another distance at which thermal effects may still cause biological tissue to sufficiently increase in temperature), the user potentially may experience adverse effect(s) due the increased temperature of the UE and/or RF emissions (e.g., thermal effects). Consequently, excessive transmission by the UE may lead to injury or other negative health consequences due to the thermal effects.

In connection with the thermal effects of transmission by a device, the RF radiation exposure for various devices communicating in various networks may be assessed. For example, a regulatory agency (e.g., the Federal Communications Commission (FCC)) may provide information related to the acceptable RF radiation exposure when devices are communicating in different networks. Examples of RF radiation exposure assessments for various devices used near the body of a user when communicating in various networks is illustrated in Table 1, infra.

TABLE 1

| Frequency Range | f < 100 kHz | 100 kHz ≤ f ≤ 10 MHz | 10 MHz < f < 10 GHz | f ≥ 10 GHz |
|---|---|---|---|---|
| Example(s) | Electric toothbrush | Wireless charging | 2G/3G/4G/5G/WiFi/Bluetooth-enabled mobile devices | mmWave devices |
| RF exposure parameter(s) | Induced electric and current fields in body | Induced electric and current fields in body; Specific Absorption Rate (SAR) | SAR | Power density |
| Purpose in relation to potential hazard to humans | Prevents effects on the nervous system | Prevents effects on the nervous system; limits heating of tissue based on absorption of RF energy | Limits heating of tissue from absorption of RF energy | Limits heating in tissue at or near the surface of user's body |

In order to reduce the possibility of injury and/or other adverse health effects that a user may experience, approaches to reducing the thermal effects caused by a UE may be beneficial. The present disclosure describes various approaches to mitigating thermal effects of a UE, thereby reducing health consequences that may otherwise be commensurate with UE use.

Figure 4:
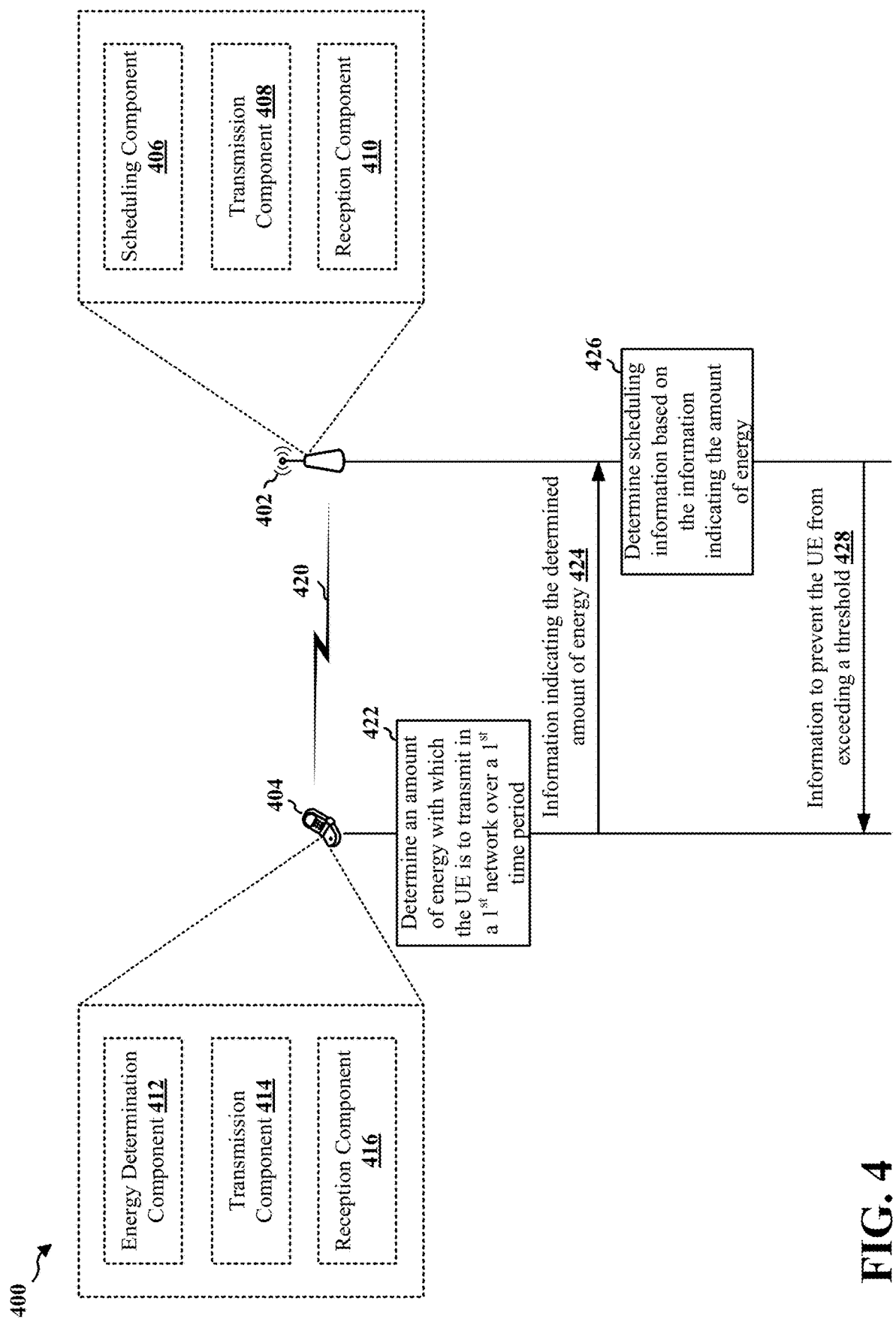
FIG. 4 is a call flow diagram illustrating a method for reporting an amount of energy at which a UE may transmit.

FIG. 4 illustrates a call flow diagram of a wireless communications system 400 in which operations described by the present disclosure may be performed. The wireless communications system 400 may include a base station 402 and a UE 404. The base station may be implemented as the base station 102/gNB 180 of FIG. 1 and/or the base station 310 of FIG. 3, while the UE 404 may be implemented as the UE 104 of FIG. 1 and/or the UE 350 of FIG. 3.

The base station 402 and the UE 404 may be configured to communicate in a first network 420. In one aspect, the first network 420 may be a mmWave and/or near-mmWave RAN (e.g., a 5G RAN). Thus, the base station 402 may be a gNB in some aspects. In other aspects, the first network 420 may be another wireless network, such as an LTE RAN, a WiFi local area network (LAN), a Bluetooth personal area network (PAN), or another wireless network. In one aspect, one or both of the base station 402 and the UE 404 may be configured to communicate in at least one other network in addition to the first network 420, such as an LTE RAN, a WiFi local area network (LAN), a Bluetooth PAN, and/or another wireless network.

The base station 402 may include at least a scheduling component 406, a first transmission component 408, and a first reception component 410. The first transmission component 408 may be configured to transmit information (e.g., data and/or control information) to the UE 404 in the first network 420. Information transmitted in the first network 420 by the first transmission component 408 may be downlink information. Correspondingly, the first reception component 410 may be configured to receive information (e.g., data and/or control information) from the UE 404 in the first network 420. Information received in the first network 420 by the first reception component 410 may be uplink information.

The scheduling component 406 may be configured to schedule the UE 404. When the scheduling component 406 determines scheduling information for the UE 404, the scheduling component 406 may provide the scheduling information to the first transmission component 408 for transmission to the UE 404 in the first network 420. In some aspects, the scheduling information may be included in downlink control information.

In one example, the scheduling component 406 may schedule uplink traffic (e.g., data and/or control information from the UE 404 to the base station 402) and downlink traffic (e.g., data and/or control information from the base station 402 to the UE 404) between the UE 404 and the base station 402 (and/or another system, such as a picocell, a femtocell, etc.). According to a second example, the scheduling component 406 may schedule the UE 404 for transmission of control information (e.g., control information to be carried on an uplink control channel, such as a PUCCH) and for transmission of data (e.g., data to be carried on an uplink shared channel, such as an uplink-shared channel (UL-SCH) and/or a PUSCH).

In a third example, the scheduling component 406 may schedule the UE 404 in order to prioritize one type of traffic over another type of traffic (e.g., the scheduling component 406 may schedule the UE 404 to transmit ultra-reliable low-latency communication (URLLC) traffic and/or mission critical (MiCr) traffic before other types of traffic). According to a fourth example, the scheduling component 406 may configure the UE 404 with a bearer (e.g., a bearer to the base station 402, a bearer to a secondary base station, a bearer to another RAN, etc.).

The UE 404 may include at least an energy determination component 412, a second transmission component 414, and a second reception component 416. The second transmission component 414 may be configured to transmit information (e.g., data and/or control information) to the base station 402 in the first network 420. Information transmitted in the first network 420 by the second transmission component 414 may be uplink information. Correspondingly, the second reception component 416 may be configured to receive information (e.g., data and/or control information) from the base station 402 in the first network 420. Information received in the first network 420 by the second reception component 416 may be downlink information.

When the second transmission component 414 transmits information (e.g., uplink data and/or control information) over the first network 420, the second transmission component 414 may cause thermal effects that would potentially adversely affect a user of the UE 404 if such transmissions are unconstrained and continuous. Therefore, the UE 404 may obtain information that indicates a threshold amount of energy with which the UE may transmit in the first network 420. For example, the UE 404 may obtain the information that indicates the threshold amount of energy based on preconfigured information stored in the UE 404 and/or the UE 404 may obtain the information that indicates the threshold amount of energy from the base station 402 when operating in the first network 420.

The UE 404 may be constrained to transmit within the threshold amount of energy, e.g., in order to reduce potentially injurious thermal effects. The threshold amount of energy may be based on at least one of a RF radiation exposure limit or a maximum permissible exposure (MPE).

However, the UE 404 may be able to exceed the threshold amount of energy in some circumstances, such as when the UE 404 is to transmit critical information (e.g., information related to an emergency, MiCr traffic, and/or other traffic of a high priority that is not to be delayed).

The amount of energy with which the UE 404 may transmit in order to reduce the likelihood of adverse health consequences due to thermal effects of transmission by the UE 404 may be based on an average over a time period, e.g., because thermal effects may be negative in accumulation over time and, therefore, an instantaneous transmission at a relatively high energy may be less likely to be harmful. For example, a threshold amount of energy and/or power may be established (e.g., based on regulatory agency guidelines), and that threshold amount of energy and/or power may be defined as an average value of a time period.

The FCC may define the MPE, which may indicate the highest energy density that is considered safe. The MPE may be defined in power density (milliwatts (mW) per square centimeter (cm²)) per average time (e.g., seconds or minutes). Illustratively, the FCC defines the MPE for the frequency range of 1,500 MHz to 100,000 MHz as five mW/cm² per six minutes $$\left(\text{i.e., } 5\frac{\frac{mW}{cm^2}}{6 \text{ minutes}}\right).$$

According to various aspects, the threshold amount of energy and/or power may not be a static value (e.g., as in a direct translation of FCC standards and/or definitions of RF radiation exposure limits and/or MPE), but may be configurable for the UE 404. For example, the UE 404 or the base station 402 may configure the threshold amount of energy and/or power for the UE 404, e.g., based on information associated with one or more previous transmissions by the UE 404 and/or one or more other factors. The threshold amount of energy and/or power may be dynamically configured for the UE 404—for example, the threshold amount of energy and/or power may be adjusted in real time based on information associated with one or more previous transmissions by the UE 404 and/or one or more other factors.

The time period associated with the threshold amount of energy may be of any duration, although the time period may be defined on the order of seconds or minutes—e.g., the time period may be three seconds. Therefore, the UE 404 may determine that the UE 404 is to refrain from transmitting over a time period (e.g., three seconds) with energies and/or powers that exceed the threshold amount of energy and/or power when the energies are averaged over the time period.

The energy determination component 412 may be configured to determine 422 an amount of energy with which the UE 404 is able to transmit in the first network 420 over a first time period, which may be a future time period (e.g., three seconds from a current time). The energy determination component 412 may determine the amount of energy with which the UE 404 is able to transmit in the first network 420 for a specific time period or interval. In one aspect, the amount of energy may be expressed as a number of millijoules (mJ), a number of mWs times number of OFDM symbols, and/or one or more other units.

In order to determine 422 the amount of energy with which the UE 404 is able to transmit in the first network 420, the energy determination component 412 may obtain a thermal effect threshold that is associated with transmission in the first network 420. For example, the thermal effect threshold may be preconfigured and stored in the UE 404, and the energy determination component 412 may obtain the thermal effect threshold from memory of the UE 404. In another example, the base station 402 may send the thermal effect threshold to the UE 404, e.g., when the UE 404 is operating on the first network 420.

The thermal effect threshold may define an average threshold value that the UE 404 is not to exceed over a corresponding time period when the second transmission component 414 is transmitting over the corresponding time period. For example, the thermal effect threshold may be expressed as a power density (e.g., $mW/cm^2$) over a corresponding time period (e.g., a number of seconds, a number of minutes, etc.). In another example, the thermal effect threshold may be expressed as an energy dissipated as heat (e.g., joule) over a corresponding time period (e.g., number of seconds, a number of minutes, etc.). The thermal effect threshold may be expressed in one or more other units without departing from the scope of the present disclosure. In one aspect, the energy determination component 412 may convert the thermal effect threshold to one or more other unit(s) in order to use the thermal effect threshold in various applications.

In one aspect, the energy determination component 412 may determine a remaining budget associated with transmission by the second transmission component 414 to determine 422 the amount of energy with which the second transmission component 414 is able to transmit in the first network 420. At the beginning of a time period, the energy determination component 412 may begin a first timer (e.g., a countdown timer), which the energy determination component 412 may set based on a predetermined interval (e.g., an interval over which the UE 404 is to refrain from exceeding the thermal budget threshold). For example, the energy determination component 412 may set the first timer to three seconds, and the average energy generated by transmissions by the second transmission component 414 during the three seconds should not exceed the thermal budget threshold.

During each first timer interval, the energy determination component 412 may measure energy generated during the first timer interval. The energy determination component 412 may restart the first timer after each interval, e.g., so that the energy generate over each interval may be determined. The average energy generated by transmissions by the second transmission component 414 during each interval should not exceed the thermal budget threshold corresponding to that interval.

In one aspect, the energy determination component 412 may determine the remaining budget as a remaining energy budget that is the difference between the amount of energy already generated by transmissions within a current interval of the first timer subtracted from the amount of energy corresponding to the thermal effect threshold for the time period. The remaining energy budget may be expressed in units of mW and/or another unit.

In another aspect, the remaining budget may be a remaining thermal budget associated with transmission by the second transmission component 414. In one aspect, the thermal budget may be based on a temperature associated with the UE 404. For example, the UE 404 may include one or more temperature sensors, which may be disposed near a surface of a housing of the UE 404. The energy determination component 412 may average the reading(s) from the temperature sensor(s) over a time period in order to determine the remaining temperature(s) that may be reached before exceeding a thermal budget threshold. In another aspect, the energy determination component 412 may determine a number of joules that have already been generated for a time period (e.g., a number of joules generated by transmissions during a current interval of the first timer). The energy determination component 412 may determine the remaining thermal budget as the number of joules already generated by transmissions in a current interval of the first timer by the second transmission component 414 subtracted from a number of joules corresponding to the thermal effect threshold for the entire interval of the first timer. The remaining thermal budget may be expressed in joules and/or another unit.

Based on the remaining budget, the energy determination component 412 may determine the amount of energy with which the second transmission component 414 may transmit in the first network 420. For example, the energy determination component 412 may determine the remaining amount of energy with which the second transmission component 414 may transmit in the first network 420 during the remaining time of a current interval of the first timer.

The energy determination component 412 may determine the amount of energy with which the second transmission component 414 may transmit in the first network 420 in at least one unit. For example, the energy determination component 412 may express the determined amount of energy as a number of mWs times a number of symbols (e.g., OFDM symbols). However, other units and/or time periods may be used without departing from the scope of the present disclosure. Thus, in some aspects, the determined amount of energy may be a value expressed as any unit of power multiplied by any unit of time.

In some other aspects, the energy determination component 412 may determine the amount of energy as a value expressed as any unit of energy, such as joules (including mJ). Potentially, the determined amount of energy may be a value expressed as any unit of energy multiplied by any unit of time. For example, the energy determination component 412 may express the determined amount of energy in a unit that includes joules, such as a number of joules times a number of symbols (e.g., a number of mJs times a number of OFDM symbols) and/or a number of joules times a number of seconds (e.g., a number of mJs times a number of seconds).

In one aspect, the energy determination component 412 may determine the remaining time in a current interval. In some aspects, the energy determination component 412 may convert the remaining time to one or more other time structures, such as a time structure defined for the first network 420. For example, the energy determination component 412 may convert the remaining time to a number of symbols defined for a mmWave network in which the UE 404 may transmit (e.g., a number of potential uplink symbols remaining in the current time interval).

The energy determination component 412 may express the remaining budget in relation to the remaining time in the current interval. For example, the energy determination component 412 may determine the amount of energy that may be used for each symbol remaining in the current time interval which may potentially carry an uplink transmission. For example, the energy determination component 412 may express the remaining budget as a number of mWs times a number of symbols (e.g., twenty mW times one symbol, ten mW times two symbols, etc.) without exceeding the thermal effect threshold. In another example, the energy determination component 412 may express a remaining thermal budget as a number of mJs times a number of symbols without exceeding the thermal effect threshold.

In various other aspects, the energy determination component 412 may determine the remaining budget as a value expressed as at least one of a number of watts (including mW) times a number of symbols, a number of watts times a number of seconds, or any other unit of power multiplied by at least one unit of time. In various further aspects, the energy determination component 412 may determine the remaining budget as a value expressed as at least one a number of joules (e.g., including mJ) or any other unit of energy. In some such further aspects, the energy determination component 412 may determine the remaining budget as a value expressed as any unit of energy multiplied by any unit of time, such as a number of joules (e.g., including mJ) times a number of symbols, a number of joules times a number of seconds, and so forth.

The energy determination component 412 may cause the second transmission component 414 to send, to the base station 402, information 424 indicating the determined amount of energy with which the UE 404 is able to transmit in the first network 420 without exceeding the thermal effect threshold. In one aspect, the information 424 indicating the determined amount of energy with which the UE 404 is able to transmit in the first network 420 without exceeding the thermal effect threshold may be known as an "energy headroom report," and the energy headroom report may indicate a time period to which the determined amount of energy is applicable (e.g., a remaining amount of a current interval of the first timer).

In one aspect, the energy determination component 412 may include the information 424 in a power headroom report (PHR). For example, the energy determination component 412 may cause the information 424 to be included an existing MAC control element (CE) in which the PHR is included. Alternatively, the energy determination component 412 may cause the information 424 to be included in a different MAC CE than the MAC CE in which the PHR is included, but in a same message as the MAC CE in which the PHR is included.

In another aspect, the energy determination component 412 may indicate the amount of energy with which the second transmission component 414 may transmit in the first network 420 without exceeding the thermal budget threshold based on a duty cycle. The energy determination component 412 may determine a power headroom for the second transmission component 414, and the power headroom may indicate an amount of power by which the second transmission component 414 may increase or decrease transmission power without exceeding a maximum transmission power at which the second transmission component 414 may transmit—e.g., a positive value for a power headroom may indicate that the second transmission component 414 may increase transmission power for future transmissions, while a negative value for a power headroom may indicate that the second transmission component 414 is currently sending transmissions with a power (e.g., the power headroom value) that is greater than the maximum transmission power configured for the second transmission component 414.

The energy determination component 412 may determine a maximum duty cycle at which the second transmission component 414 may transmit for a maximum transmission power configured for the second transmission component 414. For example, the energy determination component 412 may determine the power headroom. Further, the energy determination component 412 may determine the amount of energy that transmitting with a maximum transmission power configured for the second transmission component 414 would generate over a current interval of the first timer. That is, the energy determination component 412 may determine the remaining budget that transmitting by the second transmission component 414 would generate over a current interval of the timer if the power headroom were reduced to zero. The energy determination component 412 may compare the determined amount of energy that transmitting with the maximum configured transmission power would generate over a current interval of the first timer with the remaining budget (or the thermal effect threshold at the beginning of an interval of the first timer).

The energy determination component 412 may determine a duty cycle at which the second transmission component 414 may transmit at a maximum transmission power configured for the second transmission component 414 without exceeding the thermal effect threshold based on the comparison. For example, the duty cycle may be a percentage of time during which, if the UE 404 is scheduled, the second transmission component 414 may transmit with the maximum configured transmission power over the remainder of a time interval (e.g., the remainder of a current interval of the first timer, the remainder of a current interval before a next periodic PHR is sent, etc.). The energy determination component 412 may generate the information 424 to indicate the duty cycle, for example, as percentage of time over an interval or equivalently in dB.

By way of illustration, the energy determination component 412 may determine that a current power headroom is ten decibels (dB). Based on the remaining budget, the energy determination component 412 may determine that the second transmission component 414 may transmit twenty-five percent of the time remaining in the current interval without exceeding the thermal effect threshold. Therefore, the duty cycle may be twenty-five percent, and the energy determination component 412 may cause the second transmission component 414 to send, to the base station 402, the information 424 that indicates the determined amount of energy with which the UE 404 may transmit in the first network 420 as the duty cycle of twenty-five percent with a power headroom of ten dB. The scheduling component 406 of the base station 402 may then be able to adjust the power headroom and/or the percentage of the time which the UE 404 is scheduled based on the information 424 indicating the duty cycle, as described herein.

In aspects, the energy determination component 412 may determine to send, to the base station 402, information 424 indicating the determined amount of energy with which the UE 404 is able to transmit in the first network 420 without exceeding the thermal effect threshold. In one aspect, the energy determination component 412 may determine to send the information 424 indicating the determined amount of energy with which the UE 404 is able to transmit in the first network 420 based on an interval. For example, the energy determination component 412 may determine to send the information 424 indicating the determined amount of energy with which the UE 404 is able to transmit in the first network 420 during each interval of the first timer, e.g., a predetermined time after the energy determination component 412 begins the first timer for each interval to determine a remaining budget.

In another aspect, the energy determination component 412 may determine to send the information 424 indicating the determined amount of energy with which the UE 404 is able to transmit in the first network 420 based on an event. For example, the energy determination component 412 may determine the remaining budget during an interval of the first timer and, when the remaining budget satisfies (e.g., meets or exceeds) a budget reporting threshold, the energy determination component 412 may determine to send the information 424. The budget reporting threshold may be based on the thermal effect threshold. For example, the budget reporting threshold may be less than the thermal effect threshold (e.g., the budget reporting threshold may include a value for an amount of energy over an interval of the fixed timer that is less than a value of the thermal effect threshold over the interval of the fixed timer). Therefore, the energy determination component 412 may send the information 424 in advance and/or in anticipation of exceeding the thermal effect threshold, e.g., so that the base station 402 may schedule the UE 404 to prevent the UE 404 from exceeding the thermal effect threshold.

In another example, the energy determination component 412 may determine to send the information 424 based on a pathloss. For example, the UE 404 may measure a pathloss (e.g., with the base station 402) and compare the measured pathloss to a pathloss threshold. When the measured pathloss satisfies the pathloss threshold (e.g., meets or exceeds the pathloss threshold), then the energy determination component 412 may determine to send the information 424 to the base station 402.

In another example, the energy determination component 412 may determine to send the information 424 based on a PHR. For example, when a PHR is triggered in the UE 404 (e.g., based on a pathloss change and/or based on a PHR timer), the energy determination component 412 may determine to send the information 424 to the base station 402.

The first reception component 410 of the base station 402 may receive the information 424 indicating the amount of energy with which the UE 404 is able to transmit in the first network 420, and the first reception component 410 may provide the information 424 to the scheduling component 406. The scheduling component 406 may determine 426 scheduling information 428 the UE 404 based on the information 424 indicating the amount of energy with which the UE 404 is able to transmit in the first network 420. For example, the scheduling component 406 may determine one or more configurations for scheduling the UE 404 to prevent the UE 404 from exceeding the thermal effect threshold. In some aspects, the scheduling component 406 may change current scheduling of the UE 404 based on the information 424. In determining 426 the scheduling information 428, the base station 402 may prevent the UE 404 from exceeding the thermal effect threshold for the first network 420, e.g., over a time period indicated by the information 424.

In one aspect, the scheduling component 406 may schedule uplink traffic (e.g., data and/or control information from the UE 404 to the base station 402) and downlink traffic (e.g., data and/or control information from the base station 402 to the UE 404) between the UE 404 and the base station 402 (and/or another system, such as a picocell, a femtocell, etc.) based on the information 424. For example, when the information 424 indicates that the UE 404 has a relatively little amount of energy with which the transmit over a time period indicated by the information 424, the scheduling component 406 may decrease the time during which the UE 404 is scheduled for uplink transmission and/or increase the time during which the UE 404 is scheduled for downlink reception.

In another aspect, the scheduling component 406 may schedule the UE 404 for transmission of control information and for transmission of data based on the information 424. For example, when the information 424 indicates that the UE 404 has a relatively little amount of energy with which the transmit over a time period indicated by the information 424, the scheduling component 406 may decrease the time during which the UE 404 is scheduled for transmission of data and/or increase the time during which the UE 404 is scheduled for transmission of control information relative to the data.

In another aspect, the scheduling component 406 may schedule the UE 404 in order to prioritize one type of traffic over another type of traffic. For example, when the information 424 indicates that the UE 404 has a relatively little amount of energy with which the transmit over a time period indicated by the information 424, the scheduling component 406 may decrease the time during which the UE 404 is scheduled for transmission of lower-priority traffic (e.g., normal traffic, traffic that is not marked as URLLC, MiCr, non-emergency traffic, etc.) and/or increase the time during which the UE 404 is scheduled for transmission of high-priority traffic relative to the lower-priority traffic.

In another aspect, the scheduling component 406 may configure the UE 404 with a bearer to a second network. For example, when the information 424 indicates that the UE 404 has a relatively little amount of energy with which the transmit over a time period indicated by the information 424, the scheduling component 406 may configure the UE 404 with a bearer to the second network, such as an LTE RAN. When the UE 404 is configured with a bearer to the second network, the transmissions by the UE 404 may no longer generate energy relative to the thermal effect threshold for the first network 420. For example, when the UE 404 is configured to be changed from a bearer associated with a mmWave RAN (e.g., a 5G RAN) to a bearer associated with an LTE RAN, the UE 404 may no longer transmit in the frequency range of the mmWave RAN (e.g., 30 GHz to 300 GHz) and instead may transmit in a sub-six GHz frequency range. By transmitting in the sub-six GHz frequency range, the UE 404 may no longer generate energy contributing to the RF radiation in the mmWave frequency range and, therefore, the UE 404 may no longer contribute to the thermal effects accumulated for the mmWave frequency range.

However, the UE 404 may generate RF energy in a new frequency range (e.g., sub-six GHz) which may accumulate, e.g., toward a new threshold associated with a SAR. Therefore, the UE 404 may determine an amount of energy with which the UE 404 may transmit in the second network without exceeding the new threshold (e.g., associated with an SAR), and may perform operations (e.g., reporting the determined amount of energy for the second network) to prevent the UE 404 from exceeding the new threshold in the second network, as described herein with respect to transmissions in the first network 420.

In one aspect, the scheduling component 406 may determine whether a current scheduling for the UE 404 may cause the UE 404 to exceed the thermal effect threshold. For example, the scheduling component 406 may determine an amount of energy that the scheduling component 406 estimates that the UE 404 will generate based on the current schedule for the UE 404. The scheduling component 406 may compare a remaining budget indicated by the information 424 to the estimated amount of energy that the UE 404 may generate based on the current schedule. If the estimated amount of energy that the UE 404 may generate based on the current schedule may cause the UE 404 to exceed the remaining budget indicated by the information 424, then the scheduling component 406 may change the current schedule (e.g., as described with respect to the determination 426 of the scheduling information for the UE 404).

The scheduling component 406 may determine the scheduling information 428 based on the duty cycle indicated in the information 424. In one aspect, the scheduling component 406 may determine the scheduling information 428 further based on a power headroom indicated by a PHR received by the first reception component 410 and provided to the scheduling component 406. For example, the PHR may indicate that the power headroom for the UE 404 is ten dB, and the information 424 may indicate that the duty cycle is twenty-five percent (e.g., the second transmission component 414 of the UE 404 may transmit at a maximum transmission power during twenty-five percent of time period indicated by the information 424 without exceeding the thermal effect threshold for the time period in the first network 420). The scheduling component 406 may determine that if the UE 404 is scheduled one hundred percent of the time during the time period indicated by the information 424, then the effective power headroom for the UE 404 would be four dB, instead of ten dB (i.e., ten dB minus six dB equals four dB), in order to prevent the UE 404 from exceeding the thermal effect threshold. Alternatively, if the UE 404 is scheduled during five percent of the time period indicated by the information 424, then the effective power headroom for the UE 404 would be seventeen dB, instead of ten dB (i.e., ten dB plus seven dB equal seventeen dB), while still preventing the UE 404 from exceeding the thermal effect threshold.

The scheduling component 406 may provide the determined scheduling information 428 to the first transmission component 408. The first transmission component 408 may transmit the scheduling information 428 to the UE 404 in the first network 420.

The second reception component 416 may receive the scheduling information 428 in the first network 420. The second reception component 416 may monitor resources (e.g., for reception of downlink data and/or control information) according to the scheduling information 428. Further, the second reception component 416 may provide the scheduling information 428 to the second transmission component 414.

The second transmission component 414 may configure the UE 404 for transmission in the first network 420. For example, the second transmission component 414 may obtain information (e.g., data and/or control information, a first type of traffic, a second type of traffic, etc.) from one or more higher layers of the UE 404, and the second transmission component 414 may cause transmission of the obtained information according to the scheduling information 428. However, reception by the second reception component 416 may be prioritized over transmission by the second transmission component 414 according to the scheduling information 428 (e.g., reception may be scheduled more frequently than transmission in order to prevent energy generated by the second transmission component 414 from exceeding the thermal effect threshold).

In another example, the second transmission component 414 may transmit data and/or control information, and the control information may be prioritized over the data according to the scheduling information 428. In another example, the second transmission component 414 may transmit higher-priority traffic that is prioritized over lower-priority traffic, which may be unscheduled or scheduled less frequently according to the scheduling information 428. In another example, the second transmission component 414 and/or the second reception component 416 may have a bearer configured for transmission and reception, respectively, to a second network (e.g., an LTE RAN).

Accordingly, the UE 404 and the base station 402 may coordinate, as described herein, based on an amount of energy that is generated by the second transmission component 414 during transmissions. In so doing, the UE 404 may avoid generating RF radiation that may potentially approach injurious levels and/or fail to conform to guidelines established by a regulatory agency for RF radiation exposure (e.g., MPE as defined by the FCC).

While some aspects presented herein describe the wireless communications system 400 in the context of a mmWave or near-mmWave RAN, the present disclosure may be applicable to one or more other networks. For example, the present disclosure may be applicable to the SAR associated with sub-6 GHz networks, such as an LTE RAN, a WiFi network, a Bluetooth network, etc. Accordingly, operations described herein may be practiced in systems, devices, networks, and the like in order for a device to determine an amount of energy with which the device may transmit over a time period without exceeding a threshold, for a device to mitigate the potential for exceeding the threshold, and so forth. For example, a WiFi station (STA) may indicate an amount of energy with which the WiFi STA may transmit over a time period without exceeding an SAR threshold, and a WiFi AP may prevent the WiFi STA from exceeding the SAR threshold over the time period (e.g., by scheduling the WiFi STA similarly to the scheduling of the UE 404 by the base station 402, as described herein).

Figure 5:
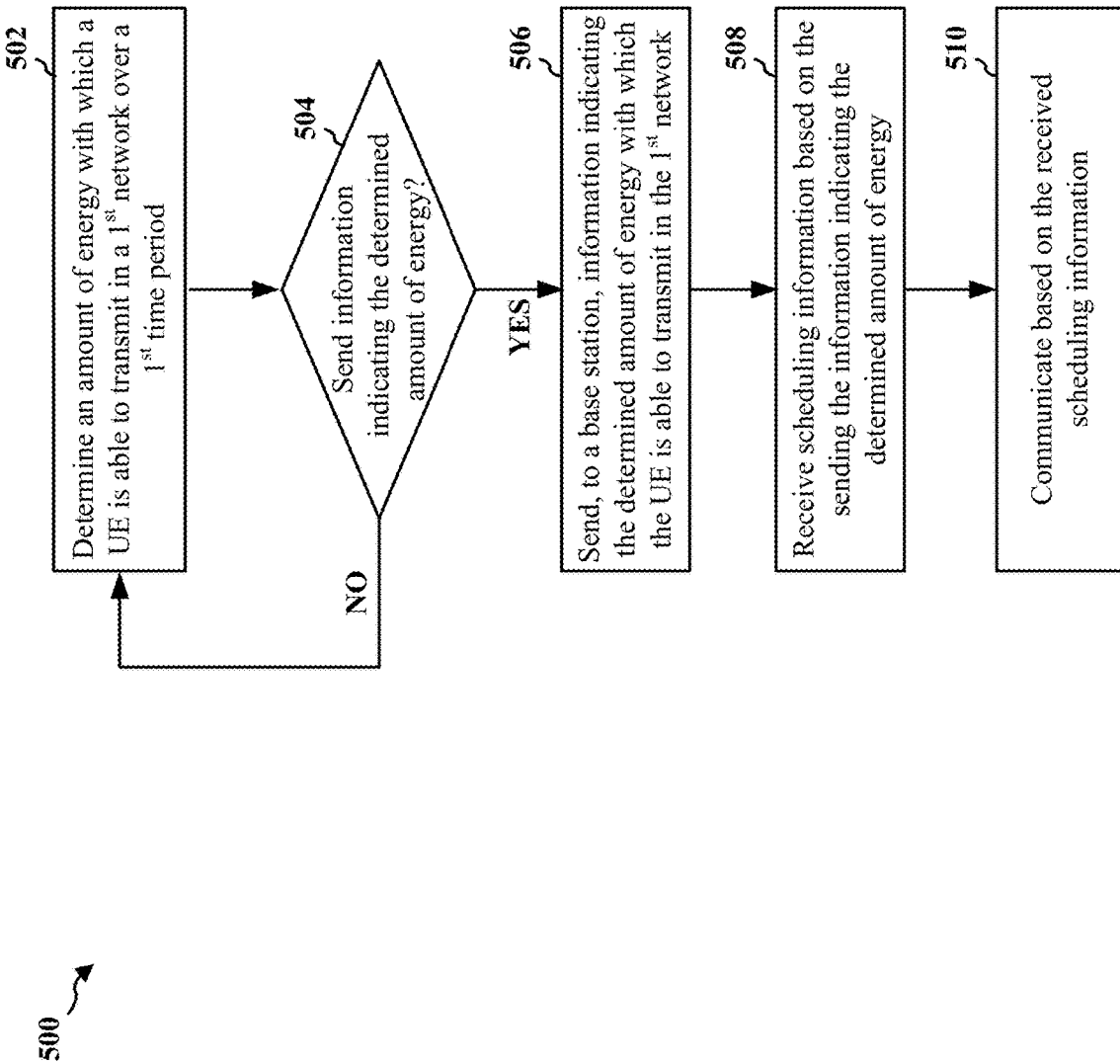
FIG. 5 is a flowchart of a method of wireless communication.

FIG. 5 is a flowchart illustrating a method 500 of wireless communication. The method 500 may be performed by a UE (e.g., the UE 104 of FIG. 1, the UE 350 of FIG. 3, and/or the UE 404 of FIG. 4), and/or apparatus (e.g., the apparatus 802/802'; the processing system 914, which may include the memory 360 and which may be the entire UE 350 or a component of the UE 350, such as the TX processor 368, the RX processor 356, and/or the controller/processor 359). One or more of the illustrated operations may be omitted, transposed, and/or contemporaneously performed, according to different aspects of the method 500. In FIG. 5, the UE may communicate with a base station in a first network—e.g., the UE may be synchronized with the base station in a mmWave or 5G RAN.

Beginning with operation 502, the UE determine an amount of energy with which the UE is able to transmit in a first network. In one aspect, the first network may be a mmWave or near-mmWave RAN, such as a 5G RAN. The UE may express the determined amount of energy in one or more units, such as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds). In the context of FIG. 4, the energy determination component 412 may determine 422 an amount of energy with which the second transmission component 414 is able to transmit in the first network 420, e.g., over an interval corresponding to the first timer without exceeding the thermal effect threshold.

In one aspect, the UE determine the amount of energy with which the UE is able to transmit in the first network is based on a remaining amount of energy with which the UE is able to transmit over a first time period without exceeding a threshold amount of energy for the first time period. For example, the UE may determine the remaining amount of energy by, first, determining a scheduled amount of energy with which the UE has already transmitted and/or is scheduled to transmit in the first time period and, second, subtracting the scheduled amount of energy from the threshold amount of energy to obtain the remaining amount of energy with which the UE is able to transmit over the first time period.

In another aspect, the UE determine the amount of energy with which the UE is able to transmit in the first network based on a thermal budget associated with transmission by the UE over a second time period (potentially the same as the first time period). The thermal budget may include a number of joules that the UE may generate when transmitting over the second time period without exceeding a threshold, such as a threshold amount of joules corresponding to a power density.

At operation 504, the UE may determine whether to send information indicating the determined amount of energy. For example, the UE may determine whether to send the information indicating the determined amount of energy based on at least one of a period of time (e.g., the UE may periodically transmit the information indicating the determined amount of energy), a pathloss change that satisfies a pathloss change threshold (e.g., to prevent the UE from losing a link with the base station), and/or comparison of the determined amount of energy to a budget reporting threshold.

In the context of FIG. 4, the energy determination component 412 may determine whether to send information indicating the determined amount of energy, e.g., based on a predefined reporting interval, based on a pathloss change detected based on signal(s) received from the base station 402, and/or based on comparison of the determined amount of energy to a budget reporting threshold that is lower than the thermal effect threshold.

When the UE determines that the information indicating the determined amount of energy with which the UE is able to transmit in the first network is not to be sent to the base station, the UE may continue to determine an amount of energy with which the UE is able to transmit (operation 602).

When the UE determines that the information indicating the determined amount of energy with which the UE is able to transmit in the first network is to be sent to the base station, the UE may send, to the base station, information indicating the determined amount of energy with which the UE is able to transmit in the first network, as shown at operation 506. In one aspect, the UE may send an energy headroom report that includes the information indicating the determined amount of energy over a time period. In one aspect, the determined amount of energy may be expressed in one or more units, such as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds).

In one aspect, the information indicating the determined amount of energy with which the UE is able to transmit in the first network may be included in a PHR. For example, the information indicating the determined amount of energy with which the UE is able to transmit in the first network may be included in a same MAC CE as a value for a power headroom, or the information indicating the determined amount of energy with which the UE is able to transmit in the first network may be included in a different MAC CE than the value for the power headroom but in a same message as the PHR.

In one aspect, the UE may indicate the determined amount of energy as a duty cycle. For example, the information indicating the determined amount of energy with which the UE is able to transmit in the first network may include a duty cycle that indicates a time period over which the UE is able to transmit at a maximum transmission power configured for the UE without exceeding a threshold amount of energy over the time period. The UE may express the duty cycle as a percentage of time or a fraction, or the duty cycle may be indicated in an equivalent value (e.g., in dB). The UE may indicate a power headroom in addition to the duty cycle.

In the context of FIG. 4, the energy determination component 412 may provide the determined amount of energy to the second transmission component 414. The second transmission component 414 may send the information 424 to indicate the determined amount of energy. For example, the information 424 may include an energy headroom report associated with a PHR and/or a duty cycle associated with a power headroom.

At operation 508, the UE may receive, from the base station, scheduling information based on the sending the information indicating the determined amount of energy. The scheduling information may include one or more of information indicating at least one uplink scheduling or downlink scheduling associated with the UE, information indicating that a first type of traffic is to be prioritized over a second type of traffic for transmission by the UE, information indicating that control information is to be prioritized over data information for transmission by the UE, and/or information indicating that the UE is to switch to a bearer associated with a second network (e.g., switch from a bearer associated with a 5G RAN to a bearer associated with an LTE RAN).

In the context of FIG. 4, the second reception component 416 may receive the scheduling information 428 from the base station 402. The second reception component 416 may provide the scheduling information 428 to the second transmission component 414.

At operation 510, the UE may communicate based on the received scheduling information. For example, the UE may reduce uplink transmissions and/or may increase downlink receptions according to the scheduling information, the UE may transmit control information before transmitting data information in the uplink according to the scheduling information, the UE may transmit higher-priority traffic before lower-priority traffic according to the scheduling information, and/or the UE may switch to a bearer associated with a second network (e.g., LTE RAN) according to the scheduling information. In the context of FIG. 4, the second reception component 416 may monitor resources (e.g., in the first network 420 or in the second network when the bearer is switched to the second network) to receive downlink information according to the scheduling information 428. The second transmission component 414 may transmit (e.g., uplink information) according to the scheduling information 428.

Figure 6:
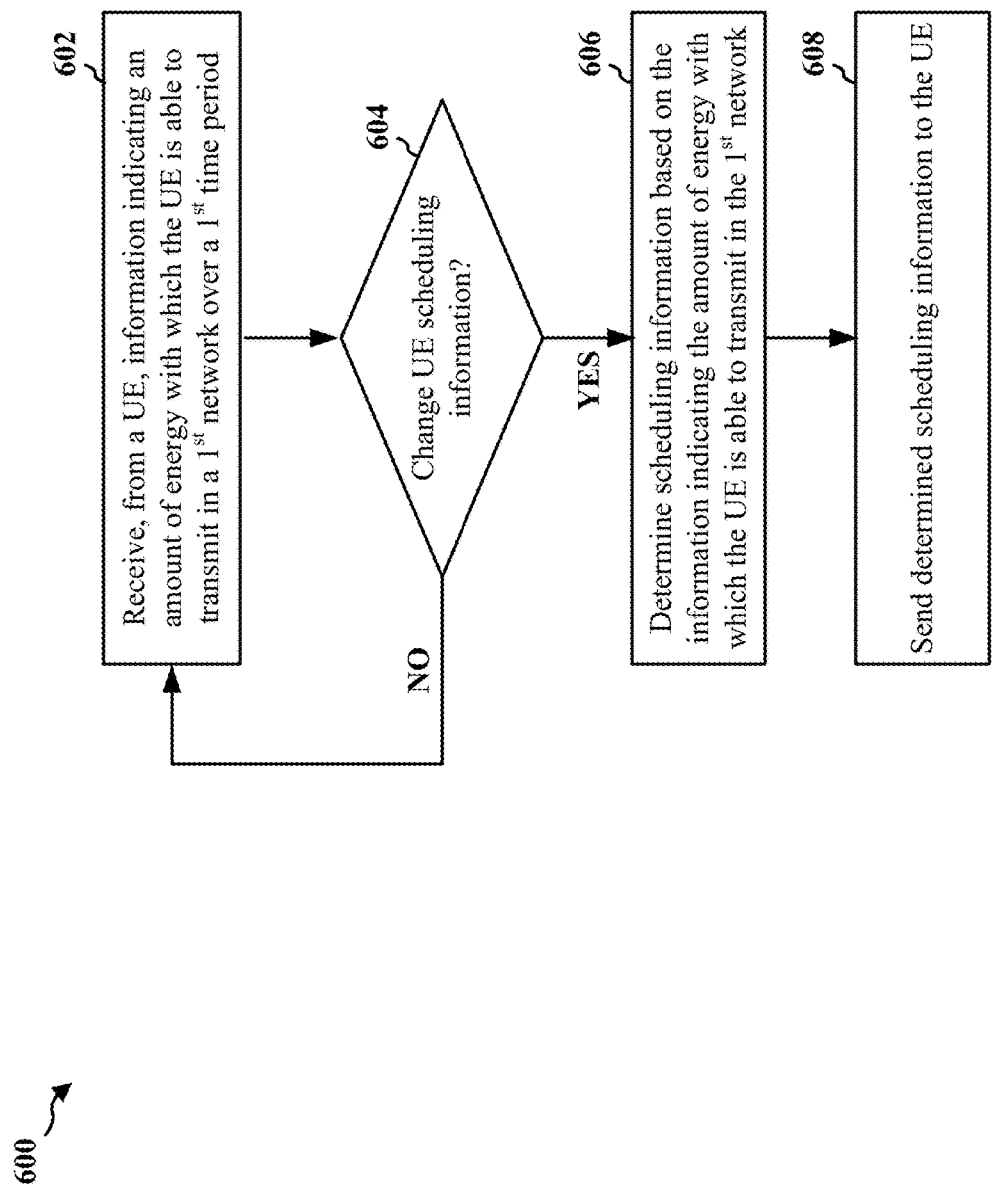
FIG. 6 is a flowchart of a method of wireless communication.

FIG. 6 is a flowchart illustrating a method 600 of wireless communication. The method 600 may be performed by a base station (e.g., a base station 102 and/or gNB 180 of FIG. 1, the base station 310 of FIG. 3, and/or the base station 402 of FIG. 4) and/or other apparatus (e.g., the apparatus 1002/1002'; the processing system 1114, which may include the memory 376 and which may be the entire base station 310 or a component of the base station 310, such as the TX processor 316, the RX processor 370, and/or the controller/processor 375). One or more of the illustrated operations may be omitted, transposed, and/or contemporaneously performed, according to different aspects of the method 600. In FIG. 6, the base station may communicate with a UE in a first network—e.g., the UE may be synchronized with the base station in a mmWave or 5G RAN.

At operation 602, the base station may receive, from the UE, information indicating an amount of energy with which the UE is able to transmit in the first network. In one aspect, the first network may be a mmWave or near-mmWave RAN, such as a 5G RAN. The base station may receive the information indicating the amount of energy with which the UE is able to transmit in the first network expressed in one or more units, such as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds).

In one aspect, the information indicating the amount of energy with which the UE is able to transmit in the first network may be included in a PHR. For example, the information indicating the amount of energy with which the UE is able to transmit in the first network may be included in a same MAC CE as a value for a power headroom, or the information indicating the determined amount of energy with which the UE is able to transmit in the first network may be included in a different MAC CE than the value for the power headroom but in a same message as the PHR.

In one aspect, the information indicating the amount of energy with which the UE is able to transmit in the first network may indicate the determined amount of energy as a duty cycle. For example, the information indicating the amount of energy with which the UE is able to transmit in the first network may include a duty cycle that indicates a time period over which the UE is able to transmit at a maximum transmission power configured for the UE without exceeding a threshold amount of energy over the time period. The information indicating the amount of energy with which the UE is able to transmit in the first network may express the duty cycle as a percentage of time or a fraction, or the duty cycle may be indicated in an equivalent value (e.g., in dB). The base station may receive a power headroom in addition to the duty cycle.

In the context of FIG. 4, the first reception component 410 may receive, from the UE 404, information 424 indicating the amount of energy with which the UE is able to transmit in the first network 420.

At operation 604, the base station determine whether scheduling information for the UE is to be changed. For example, the base station may determine that the UE is currently scheduled such that transmissions by the UE are likely to cause the UE to exceed a threshold amount of energy over a time period. In the context of FIG. 4, the scheduling component 406 may determine that scheduling information configured for the UE 404 is to be changed, e.g., in order to prevent the UE from exceeding the thermal effect threshold.

When the base station determines that the scheduling information for the UE is to remain unchanged, the base station may continue to monitor for one or more messages from the UE that include information indicating an amount of energy with which the UE is able to transmit in the first network (operation 602).

When the base station determines that the scheduling information for the UE is to be changed, the base station may determine scheduling information based on the information indicating the amount of energy with which the UE is able to transmit in the first RAN, as shown at operation 606. The base station may determine the scheduling information to prevent the UE from exceeding a threshold amount of energy. The base station may estimate an amount of energy that may be generated by the UE when transmitting over a time period, and the base station may determine the scheduling information so that the estimated amount of energy does not exceed a threshold amount of energy over the time period. Various aspects of operation 606 may be illustrated in FIG. 7.

In the context of FIG. 4, the scheduling component 406 may determine 426 scheduling information 428. The scheduling component 406 may determine 426 the scheduling information 428 in order to prevent the UE 404 from exceeding the thermal effect threshold.

At operation 608, the base station may send the determined scheduling information to the UE. In the context of FIG. 4, the scheduling component 406 may provide the determined scheduling information 428 to the first transmission component 408, and the first transmission component 408 may transmit the scheduling information 428 to the UE 404 over the first network 420.

FIG. 7 is a flowchart illustrating a method 700 of wireless communication. The method 700 illustrates one or more aspects of operation 606, illustrated in FIG. 6. In determining the scheduling information for the UE to prevent the UE from exceeding a threshold amount of energy (operation 606), the base station may perform one or more of the operations 702, 704, 706, 708.

At operation 702, the base station may determine at least one of an uplink schedule for transmission by the UE or a downlink schedule for reception by the UE, e.g., based on the information indicating the amount of energy with which the UE is able to transmit in the first network. For example, the base station may decrease the duration for which the UE is scheduled to send uplink data and/or control information based on the information indicating the amount of energy with which the UE is able to transmit in the first network. In the context of FIG. 4, the scheduling component 406 may determine at least one of an uplink schedule for transmission by the UE 404 or a downlink schedule for reception by the UE 404, e.g., based on the information 424, in order to prevent the UE 404 from exceeding the thermal effect threshold.

At operation 704, the base station may determine a prioritization between a first type of traffic to be transmitted by the UE and a second type of traffic to be transmitted by the UE, e.g., based on the information indicating the amount of energy with which the UE is able to transmit in the first network. For example, the base station may schedule the UE so that the UE continues to transmit at least a portion of higher-priority traffic (e.g., URLLC traffic, MiCr traffic, traffic with low-latency and/or high throughput constraints, etc.), and the base station may schedule the UE to refrain from transmitting at least a portion of lower-priority traffic (e.g., normal data, etc.)).

In the context of FIG. 4, the scheduling component 406 may determine a prioritization for transmission by the UE 404 between a first type of traffic and a second type of traffic, e.g., based on the information 424, in order to prevent the UE 404 from exceeding the thermal effect threshold. For example, the scheduling component 406 may schedule at least a portion of higher-priority traffic which the UE 404 is to transmit, and the scheduling component 406 may refrain from scheduling at least a portion of lower-priority traffic which the UE 404 may transmit.

At operation 706, the base station may determine a prioritization between a control information to be transmitted by the UE and a data information to be transmitted by the UE, e.g., based on the information indicating the amount of energy with which the UE is able to transmit in the first network. For example, the base station may schedule the UE so that the UE continues to transmit at least a portion of control information (e.g., on a PUCCH), and the base station may schedule the UE to refrain from transmitting at least a portion of data information (e.g., on a PUSCH or UL-SCH).

In the context of FIG. 4, the scheduling component 406 may determine a prioritization for transmission by the UE 404 between control information and data information, e.g., based on the information 424, in order to prevent the UE 404 from exceeding the thermal effect threshold. For example, the scheduling component 406 may schedule at least a portion of control information which the UE 404 is to transmit on an uplink control channel, and the scheduling component 406 may refrain from scheduling at least a portion of data information which the UE 404 may transmit on an uplink shared channel.

At operation 708, the base station may determine to switch the UE to a bearer associated with a second network that is different from the first network, e.g., based on the information indicating the amount of energy with which the UE is able to transmit in the first network. For example, the base station may configure the UE with a bearer to a second network (e.g., an LTE RAN) having a different carrier frequency than the first network (e.g., a mmWave or near-mmWave RAN). In the context of FIG. 4, the scheduling component 406 may determine to switch the UE to a bearer associated with a second network that is different from the first network 420, e.g., based on the information 424, in order to prevent the UE 404 from exceeding the thermal effect threshold.

Figure 8:
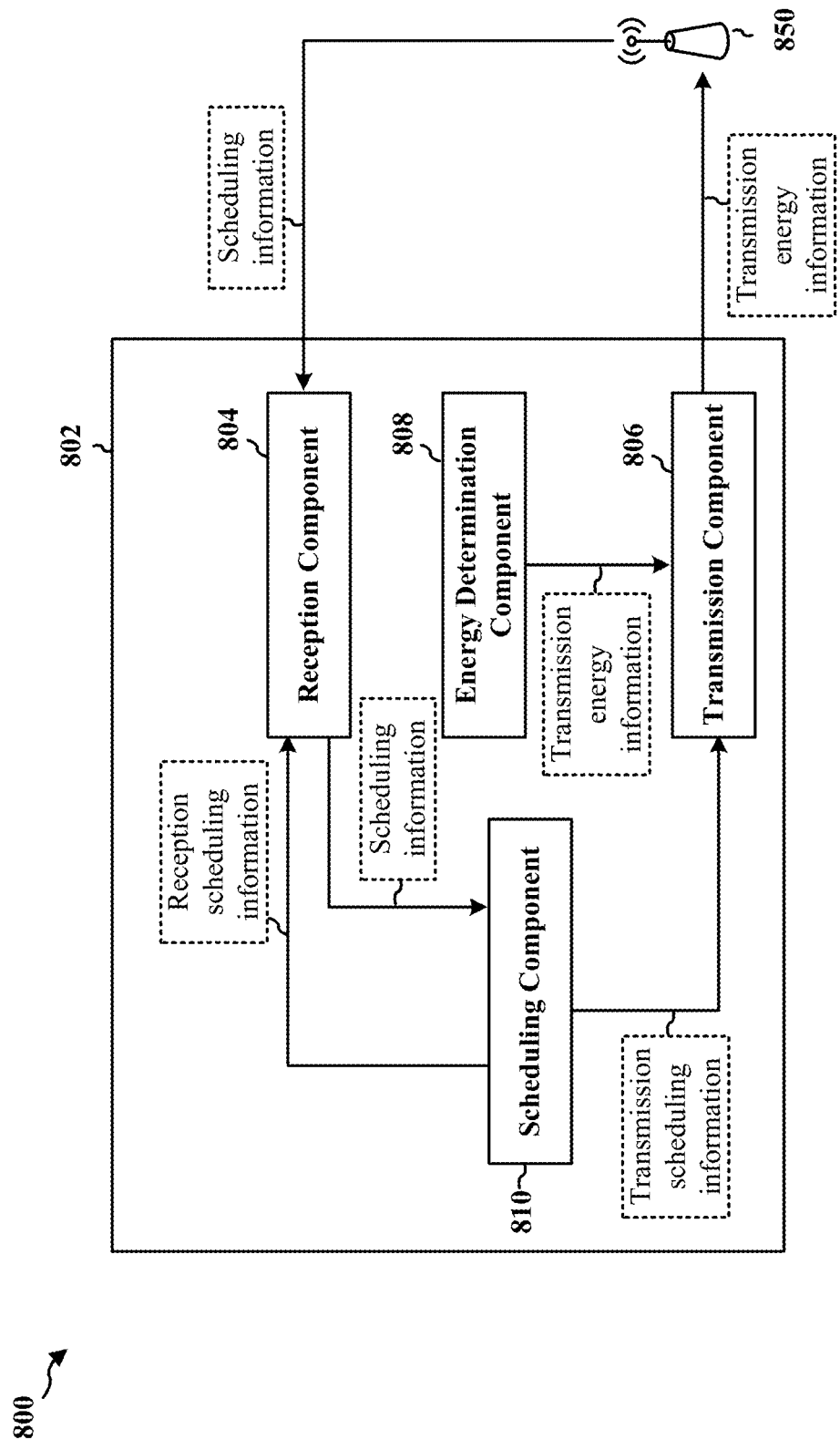
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus 802 may be a UE.

The apparatus 802 may communicate with the base station 850 in at least a first network, which may include a mmW and/or near-mmW RAN. To that end, the apparatus 802 includes a reception component 804 that is configured to receive signals, e.g., from the base station 850. Further, the apparatus 802 includes a transmission component 806 that is configured to transmit signals, e.g., to the base station 850.

The apparatus 802 may include an energy determination component 808. The energy determination component 808 may be configured to determine an amount of energy with which the apparatus 802 is able to transmit in the first network over a first time period, e.g., as described in connection with operation 502 of FIG. 5. The determined amount of energy may include at least one value expressed as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds). The energy determination component 808 may determine the amount of energy with which the apparatus 802 is able to transmit in the first network over the first time period based on a remaining amount of energy with which the apparatus 802 is able to transmit over the first time period without exceeding a threshold amount of energy for the first time period or based on a remaining amount of thermal budget associated with transmission by the apparatus 802 over the first time period.

The energy determination component 808 may provide information indicating the determined amount of energy to the transmission component 806. In one aspect, the information indicating the determined amount of energy may include an energy headroom report that indicates the determined amount of energy over the first time period. For example, the energy headroom report may be included in a PHR. In another aspect, the information indicating the determined amount of energy may include a power headroom and a duty cycle, and the duty cycle may indicate a percentage of the first time period at which the apparatus 802 is able to transmit using a reported maximum transmission power for the apparatus 802 without exceeding a threshold amount of energy for the first time period.

The energy determination component 808 may determine whether to send information indicating the determined amount of energy, e.g., as described in connection with operation 504 of FIG. 5. For example, the energy determination component 808 may determine whether to send the information indicating the determined amount of energy based on at least one of a period of time (e.g., the energy determination component 808 may periodically cause the transmission component 806 to transmit information indicating the determined amount of energy), a pathloss change that satisfies a pathloss change threshold (e.g., to prevent the apparatus 802 from losing a link with the base station 850), and/or comparison of the determined amount of energy to a budget reporting threshold.

When the energy determination component 808 determines that the information indicating the determined amount of energy with which the apparatus 802 is able to transmit in the first network is not to be sent to the base station 850, the energy determination component 808 may continue to determine an amount of energy with which the apparatus 802 is able to transmit.

When the energy determination component 808 determines that the information indicating the determined amount of energy with which the apparatus 802 is able to transmit in the first network is to be sent to the base station 850, the energy determination component 808 may provide the information indicating the determined amount of energy to the transmission component 806.

The transmission component 806 may transmit, to the base station 850, the information indicating the determined amount of energy with which the apparatus 802 is able to transmit in the first network, e.g., as described in connection with operation 506 of FIG. 5. In one aspect, the transmission component 806 may transmit an energy headroom report that includes the information indicating the determined amount of energy over the first time period. In one aspect, the determined amount of energy may be expressed in one or more units, such as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds). In one aspect, the information indicating the determined amount of energy with which the apparatus 802 is able to transmit in the first network may be included in a PHR. For example, the information indicating the determined amount of energy with which the apparatus 802 is able to transmit in the first network may be included in a same MAC CE as a value for a power headroom, or the information indicating the determined amount of energy with which the apparatus 802 is able to transmit in the first network may be included in a different MAC CE than the value for the power headroom but in a same message as the PHR.

In one aspect, the information indicating the determined amount of energy may be indicated in association with a duty cycle. For example, the information indicating the determined amount of energy with which the apparatus 802 is able to transmit in the first network may include a duty cycle that indicates a time period over which the apparatus 802 is able to transmit at a maximum transmission power configured for the apparatus 802 without exceeding a threshold amount of energy over the time period. The energy determination component 808 may express the duty cycle as a percentage of time or a fraction, or the duty cycle may be indicated in an equivalent value (e.g., in dB). The transmission component 806 may indicate a power headroom in addition to the duty cycle.

The reception component 804 may receive, from the base station 850, scheduling information based on the transmission of the information indicating the determined amount of energy, e.g., as described in connection with operation 508 of FIG. 5. The scheduling information may include one or more of information indicating at least one uplink scheduling or downlink scheduling associated with the apparatus 802, information indicating that a first type of traffic is to be prioritized over a second type of traffic for transmission by the apparatus 802, information indicating that control information is to be prioritized over data information for transmission by the apparatus 802, and/or information indicating that the apparatus 802 is to switch to a bearer associated with a second network (e.g., switch from a bearer associated with a 5G RAN to a bearer associated with an LTE RAN).

The reception component 804 may provide the scheduling information to a scheduling component 810. The scheduling component 810 may cause the reception component 804 and/or the transmission component 806 to communicate based on the received scheduling information, e.g., as described in connection with operation 510 of FIG. 5. For example, the scheduling component 810 may reduce uplink transmissions and/or may increase downlink receptions according to the scheduling information, the scheduling component 810 may cause transmission of control information before transmission of data information in the uplink according to the scheduling information, the scheduling component 810 may cause transmission of higher-priority traffic before lower-priority traffic according to the scheduling information, and/or the scheduling component 810 may switch to a bearer associated with a second network (e.g., LTE RAN) according to the scheduling information.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
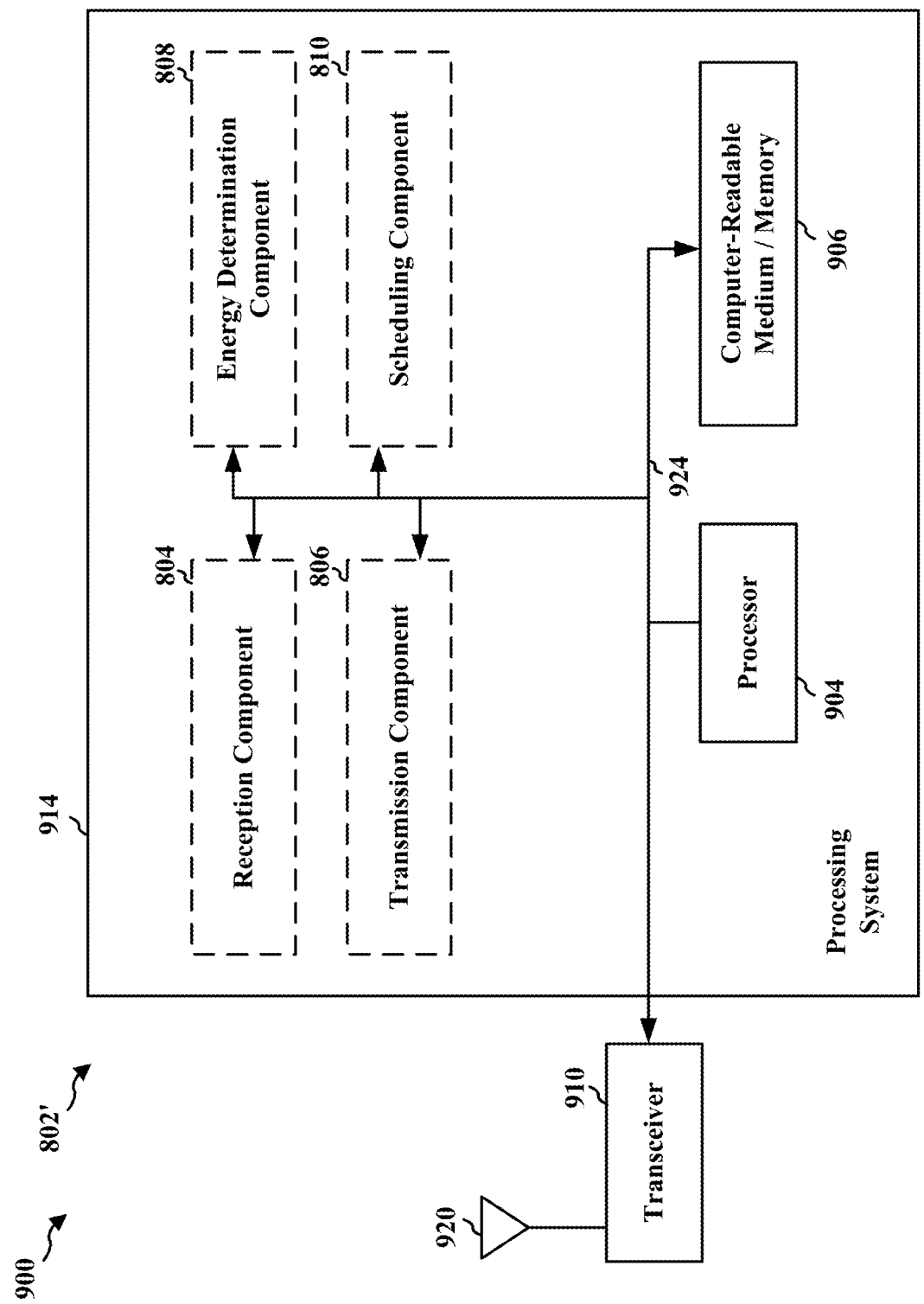
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for determining an amount of energy with which the apparatus 802/802' is able to transmit in a first network over a first time period. The apparatus 802/802' further includes means for sending, to a base station, information indicating the determined amount of energy. The apparatus 802/802' further includes means for receiving, from the base station, scheduling information based on the information indicating the determined amount of energy.

In one aspect, the information indicating the determined amount of energy includes an energy headroom report that indicates the determined amount of energy over the first time period. In one aspect, the energy headroom report is included in a PHR. In one aspect, the determined amount of energy includes at least one of a number of watts times a number of symbols, a number of watts times a number of seconds, a number of joules times a number of symbols, a number of joules times a number of seconds, or a number of joules. In one aspect, the information indicating the determined amount of energy includes a power headroom and a duty cycle, and the duty cycle indicates a percentage of the first time period at which the apparatus 802/802' is able to transmit using a reported maximum transmission power for the apparatus 802/802' without exceeding a threshold amount of energy for the first time period.

In one aspect, the sending the information indicating the determined amount of energy is based on at least one of a period of time, a pathloss change that satisfies a pathloss change threshold, or comparison of the determined amount of energy to a threshold. In one aspect, the amount of energy with which the apparatus 802/802' is able to transmit in the first network is based on a remaining amount of energy with which the apparatus 802/802' is able to transmit over the first time period without exceeding a threshold amount of energy for the first time period or based on a remaining amount of thermal budget associated with transmission by the apparatus 802/802' over the first time period. In one aspect, the threshold amount of energy is based on at least one of an RF radiation exposure limit or an MPE.

In one aspect, the scheduling information includes one or more of information indicating at least one of uplink scheduling or downlink scheduling associated with the apparatus 802/802', information indicating that a first type of data is to be prioritized over a second type of data for transmission by the apparatus 802/802', information indicating that control information is to be prioritized over data information for transmission by the apparatus 802/802', or information indicating that the apparatus 802/802' is to switch to a bearer associated with an LTE RAN. In one aspect, the first network includes a mmW RAN.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
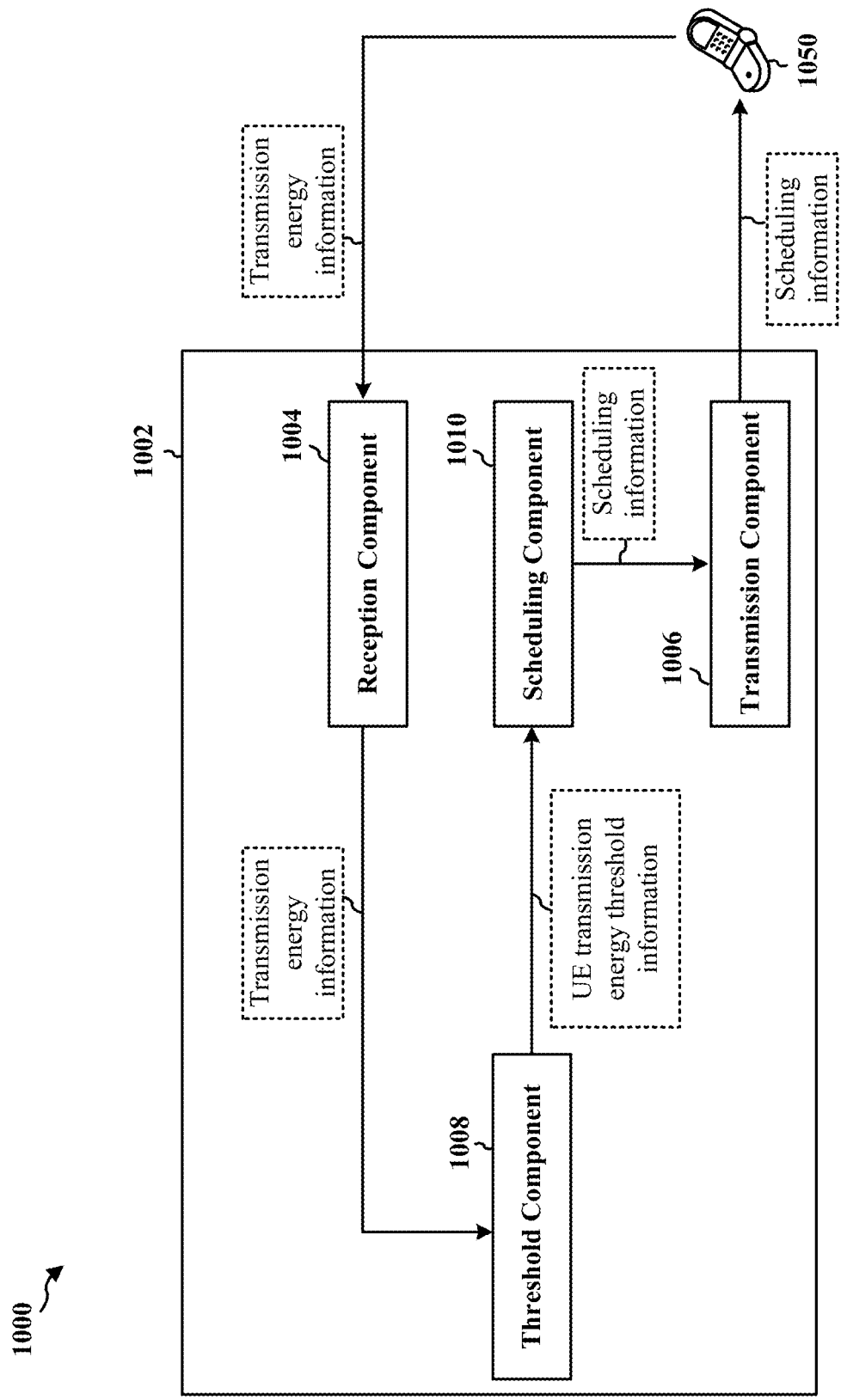
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus 1002 may be a base station. The apparatus 1002 may communicate with a UE 1050 in at least a first network, which may include a mmW and/or near-mmW RAN. To that end, the apparatus 1002 includes a reception component 1004 that is configured to receive signals, e.g., from the UE 1050. Further, the apparatus 1002 includes a transmission component 1006 that is configured to transmit signals, e.g., to the UE 1050.

The reception component 1004 may receive, from the UE 1050, information indicating an amount of energy with which the UE 1050 is able to transmit in the first network, e.g., as described in connection with operation 602 of FIG. 6. In one aspect, the first network may be a mmWave or near-mmWave RAN, such as a 5G RAN. The reception component 1004 may receive the information indicating the amount of energy with which the UE 1050 is able to transmit in the first network expressed in one or more units, such as at least one of a number of watts (e.g., including mW) times a number of symbols, a number of watts times a number of seconds, a number of joules (e.g., including mJ) times a number of symbols, a number of joules times a number of seconds, or a number of joules, or any other unit of power (e.g., watts) or energy (e.g., joules), which may be multiplied by any other unit of time (e.g., symbols or seconds).

In one aspect, the information indicating the amount of energy with which the UE 1050 is able to transmit in the first network may be included in a PHR. For example, the information indicating the amount of energy with which the UE 1050 is able to transmit in the first network may be included in a same MAC CE as a value for a power headroom, or the information indicating the determined amount of energy with which the UE 1050 is able to transmit in the first network may be included in a different MAC CE than the value for the power headroom but in a same message as the PHR.

In one aspect, the information indicating the amount of energy with which the UE 1050 is able to transmit in the first network may indicate the determined amount of energy as a duty cycle. For example, the information indicating the amount of energy with which the UE 1050 is able to transmit in the first network may include a duty cycle that indicates a time period over which the UE 1050 is able to transmit at a maximum transmission power configured for the UE 1050 without exceeding a threshold amount of energy over the time period. The information indicating the amount of energy with which the UE 1050 is able to transmit in the first network may express the duty cycle as a percentage of time or a fraction, or the duty cycle may be indicated in an equivalent value (e.g., in dB). The reception component 1004 may receive a power headroom in addition to the duty cycle.

The apparatus 1002 may include a threshold component 1008 configured to determine whether scheduling information for the UE 1050 is to be changed, e.g., as described in connection with operation 604 of FIG. 6. For example, the threshold component 1008 may determine that the UE 1050 is currently scheduled such that transmissions by the UE 1050 are likely to cause the UE 1050 to exceed a threshold amount of energy over a time period. When the threshold component 1008 determines that the scheduling information for the UE 1050 is to remain unchanged, the threshold component 1008 may continue to monitor for one or more messages from the UE 1050 that include information indicating an amount of energy with which the UE 1050 is able to transmit in the first network.

When the threshold component 1008 determines that the scheduling information for the UE 1050 is to be changed, the threshold component 1008 may provide information indicating the amount of energy with which the UE 1050 is able to transmit in the first RAN to a scheduling component 1010.

The scheduling component 1010 may determine scheduling information based on the information indicating the amount of energy with which the UE 1050 is able to transmit in the first RAN, e.g., as described in connection with operation 606 of FIG. 6. The scheduling component 1010 may determine the scheduling information to prevent the UE 1050 from exceeding a threshold amount of energy. The scheduling component 1010 may estimate an amount of energy that may be generated by the UE 1050 when transmitting over a time period, and the scheduling component 1010 may determine the scheduling information so that the estimated amount of energy does not exceed a threshold amount of energy over the time period.

In one aspect, the scheduling component 1010 may determine at least one of an uplink schedule for transmission by the UE 1050 or a downlink schedule for reception by the UE 1050, e.g., as described in connection with operation 702 of FIG. 7. The scheduling component 1010 may determine the at least one of the uplink schedule or the downlink schedule based on the information indicating the amount of energy with which the UE 1050 is able to transmit in the first network. For example, the scheduling component 1010 may decrease the duration for which the UE 1050 is scheduled to send uplink data and/or control information based on the information indicating the amount of energy with which the UE 1050 is able to transmit in the first network.

In another aspect, the scheduling component 1010 may determine a prioritization between a first type of traffic to be transmitted by the UE 1050 and a second type of traffic to be transmitted by the UE 1050, e.g., as described in connection with operation 704 of FIG. 7. The scheduling component 1010 may determine the prioritization between the first type of traffic and the second type of traffic based on the information indicating the amount of energy with which the UE 1050 is able to transmit in the first network. For example, the scheduling component 1010 may schedule the UE 1050 so that the UE 1050 continues to transmit at least a portion of higher-priority traffic (e.g., URLLC traffic, MiCr traffic, traffic with low-latency and/or high throughput constraints, etc.), and the scheduling component 1010 may schedule the UE 1050 to refrain from transmitting at least a portion of lower-priority traffic (e.g., normal data, etc.)).

In a further aspect, the scheduling component 1010 may determine a prioritization between a control information to be transmitted by the UE 1050 and a data information to be transmitted by the UE 1050, e.g., as described in connection with operation 706 of FIG. 7. The scheduling component 1010 may determine the prioritization based on the information indicating the amount of energy with which the UE 1050 is able to transmit in the first network. For example, the scheduling component 1010 may schedule the UE 1050 so that the UE 1050 continues to transmit at least a portion of control information (e.g., on a PUCCH), and the scheduling component 1010 may schedule the UE 1050 to refrain from transmitting at least a portion of data information (e.g., on a PUSCH or UL-SCH).

In still another aspect, the scheduling component 1010 may determine to switch the UE 1050 to a bearer associated with a second network that is different from the first network, e.g., as described in connection with operation 708 of FIG. 7. The scheduling component 1010 may determine to switch the UE 1050 to the bearer associated with the second network based on the information indicating the amount of energy with which the UE 1050 is able to transmit in the first network. For example, the scheduling component 1010 may configure the UE 1050 with a bearer to the second network (e.g., an LTE RAN) having a different carrier frequency than the first network (e.g., a mmWave or near-mmWave RAN).

The scheduling component 1010 may provide the scheduling information to the transmission component 1006. The transmission component 1006 may transmit the determined scheduling information to the UE 1050, e.g., as described in connection with operation 608 of FIG. 6.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
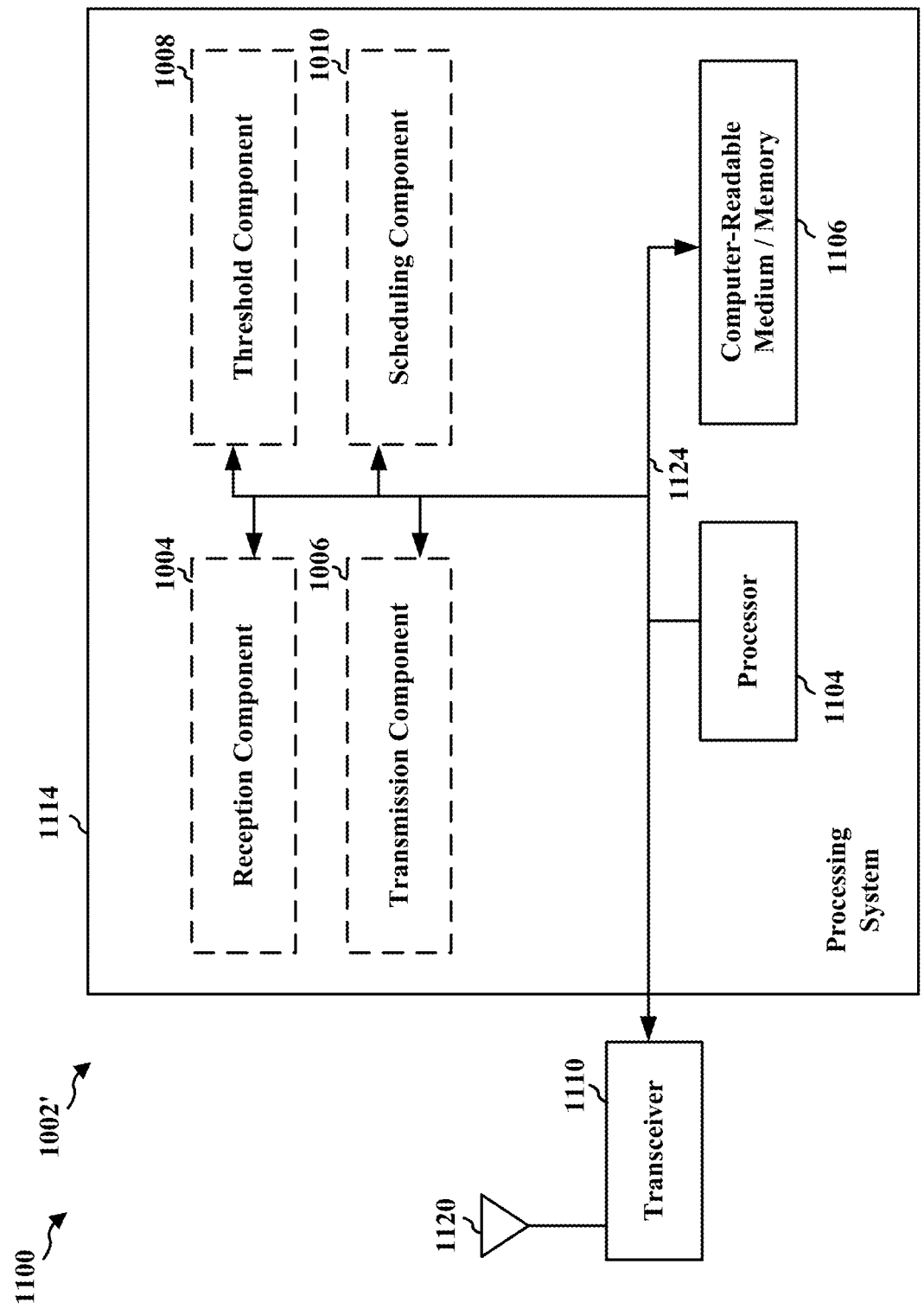
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for receiving, from a UE, information indicating an amount of energy with which the UE is able to transmit in a first network over a first time period. The apparatus 1002/1002' includes means for determining scheduling information based on the information indicating the amount of energy with which the UE is able to transmit in the first network, the scheduling information to prevent the UE from exceeding a threshold amount of energy for a time period. The apparatus 1002/1002' includes means for sending, to the UE, information indicating the scheduling information.

In one aspect, the information indicating the amount of energy includes an energy headroom report that indicates the determined amount of energy over the first time period. In one aspect, the energy headroom report is included in a PHR received from the UE. In one aspect, the determined amount of energy includes at least one of a number of watts times a number of symbols, a number of watts times a number of seconds, a number of joules times a number of symbols, a number of joules times a number of seconds, or a number of joules. In one aspect, the information indicating the amount of energy includes a power headroom and a duty cycle, and the duty cycle indicates a percentage of the first time period at which the UE is able to transmit using a maximum transmission power configured for the UE without exceeding a threshold amount of energy for the first time period. In one aspect, the threshold amount of energy is based on at least one of an RF radiation exposure limit or an MPE.

According to various aspects, the means for determining scheduling information based on the amount of energy is configured to at least one of: determine at least one of an uplink schedule for transmission by the UE or a downlink schedule for reception by the UE, determine a prioritization between a first type of traffic to be transmitted by the UE and a second type of traffic to be transmitted by the UE, determine a prioritization between control information to be transmitted by the UE and data information to be transmitted by the UE, or determine to switch the UE to a bearer associated with a second network that is different from the first network. In one aspect, the first network includes a mmW RAN.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), the method comprising:
    determining an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
    sending, to a base station, information indicating the determined amount of energy; and
    receiving, from the base station, scheduling information based on the information indicating the determined amount of energy.

2. The method of claim 1, wherein the determined amount of energy comprises at least one of a number of watts times a number of symbols, a number of watts times a number of seconds, a number of joules times a number of symbols, a number of joules times a number of seconds, or a number of joules.

3. The method of claim 1, wherein the information indicating the determined amount of energy comprises an energy headroom report that indicates the determined amount of energy over the first time period.

4. The method of claim 3, wherein the energy headroom report is included in a power headroom report (PHR).

5. The method of claim 1, wherein the information indicating the determined amount of energy comprises a power headroom and a duty cycle, wherein the duty cycle indicates a percentage of the first time period at which the UE is able to transmit using a reported maximum transmission power for the UE without exceeding the threshold amount of energy for the first time period.

6. The method of claim 1, wherein the sending the information indicating the determined amount of energy is based on at least one of a period of time, a pathloss change that satisfies a pathloss change threshold, or comparison of the determined amount of energy to a threshold.

7. The method of claim 1, wherein the amount of energy with which the UE is able to transmit in the first network is based on the remaining amount of energy with which the UE is able to transmit over the first time period without exceeding the threshold amount of energy for the first time period or based on remaining temperatures that are to be reached prior to exceeding a thermal budget threshold associated with transmission by the UE over the first time period.

8. The method of claim 7, wherein the threshold amount of energy is based on at least one of a radio frequency (RF) radiation exposure limit or a maximum permissible exposure (MPE).

9. The method of claim 1, wherein the scheduling information comprises one or more of information indicating at least one of uplink scheduling or downlink scheduling associated with the UE, information indicating that a first type of data is to be prioritized over a second type of data for transmission by the UE, information indicating that control information is to be prioritized over data information for transmission by the UE, or information indicating that the UE is to switch to a bearer associated with a Long Term Evolution (LTE) radio access network (RAN).

10. The method of claim 1, wherein the first network comprises a millimeter wave (mmW) radio access network (RAN).

11. A method of wireless communication for a base station, the method comprising:
receiving, from a user equipment (UE), information indicating an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
determining scheduling information based on the information indicating the amount of energy with which the UE is able to transmit in the first network, the scheduling information to prevent the UE from exceeding the threshold amount of energy for the first time period; and
sending, to the UE, information indicating the scheduling information.

12. The method of claim 11, wherein the information indicating the amount of energy comprises an energy headroom report that indicates the determined amount of energy over the first time period.

13. The method of claim 12, wherein the energy headroom report is included in a power headroom report (PHR) received from the UE.

14. The method of claim 11, wherein the determined amount of energy comprises at least one of a number of watts times a number of symbols, a number of watts times a number of seconds, a number of joules times a number of symbols, a number of joules times a number of seconds, or a number of joules.

15. The method of claim 11, wherein the information indicating the amount of energy comprises a power headroom and a duty cycle, wherein the duty cycle indicates a percentage of the first time period at which the UE is able to transmit using a maximum transmission power configured for the UE without exceeding the threshold amount of energy for the first time period.

16. The method of claim 15, wherein the threshold amount of energy is based on at least one of a radio frequency (RF) radiation exposure limit or a maximum permissible exposure (MPE).

17. The method of claim 11, wherein the determining scheduling information based on the amount of energy comprises at least one of:
determining at least one of an uplink schedule for transmission by the UE or a downlink schedule for reception by the UE,
determining a prioritization between a first type of traffic to be transmitted by the UE and a second type of traffic to be transmitted by the UE,
determining a prioritization between control information to be transmitted by the UE and data information to be transmitted by the UE, or
determining to switch the UE to a bearer associated with a second network that is different from the first network.

18. The method of claim 11, wherein the first network comprises a millimeter wave (mmW) radio access network (RAN).

19. An apparatus for wireless communication by a user equipment (UE), the apparatus comprising:
means for determining an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
means for sending, to a base station, information indicating the determined amount of energy; and
means for receiving, from the base station, scheduling information based on the information indicating the determined amount of energy.

20. The apparatus of claim 19, wherein the information indicating the determined amount of energy comprises an energy headroom report that indicates the determined amount of energy over the first time period.

21. The apparatus of claim 20, wherein the energy headroom report is included in a power headroom report (PHR).

22. The apparatus of claim 19, wherein the determined amount of energy comprises at least one of a number of watts times a number of symbols, a number of watts times a number of seconds, a number of joules times a number of symbols, a number of joules times a number of seconds, or a number of joules.

23. The apparatus of claim 19, wherein the information indicating the determined amount of energy comprises a power headroom and a duty cycle, wherein the duty cycle indicates a percentage of the first time period at which the UE is able to transmit using a reported maximum transmission power for the UE without exceeding the threshold amount of energy for the first time period.

24. The apparatus of claim 19, wherein the sending the information indicating the determined amount of energy is based on at least one of a period of time, a pathloss change that satisfies a pathloss change threshold, or comparison of the determined amount of energy to a threshold.

25. The apparatus of claim 19, wherein the amount of energy with which the UE is able to transmit in the first network is based on the remaining amount of energy with which the UE is able to transmit over the first time period without exceeding the threshold amount of energy for the first time period or based on remaining temperatures that are to be reached prior to exceeding a thermal budget threshold associated with transmission by the UE over the first time period.

26. The apparatus of claim 25, wherein the threshold amount of energy is based on at least one of a radio frequency (RF) radiation exposure limit or a maximum permissible exposure (MPE).

27. The apparatus of claim 19, wherein the scheduling information comprises one or more of information indicating at least one of uplink scheduling or downlink scheduling associated with the UE, information indicating that a first type of data is to be prioritized over a second type of data for transmission by the UE, information indicating that control information is to be prioritized over data information for transmission by the UE, or information indicating that the UE is to switch to a bearer associated with a Long Term Evolution (LTE) radio access network (RAN).

28. The apparatus of claim 19, wherein the first network comprises a millimeter wave (mmW) radio access network (RAN).

29. An apparatus for wireless communication by a base station, the apparatus comprising:
means for receiving, from a user equipment (UE), information indicating an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
means for determining scheduling information based on the information indicating the amount of energy with which the UE is able to transmit in the first network, the scheduling information to prevent the UE from exceeding the threshold amount of energy for the first time period; and
means for sending, to the UE, information indicating the scheduling information.

30. The apparatus of claim 29, wherein the information indicating the amount of energy comprises an energy headroom report that indicates the determined amount of energy over the first time period.

31. The apparatus of claim 30, wherein the energy headroom report is included in a power headroom report (PHR) received from the UE.

32. The apparatus of claim 29, wherein the determined amount of energy comprises at least one of a number of watts times a number of symbols, a number of watts times a number of seconds, a number of joules times a number of symbols, a number of joules times a number of seconds, or a number of joules.

33. The apparatus of claim 29, wherein the information indicating the amount of energy comprises a power headroom and a duty cycle, wherein the duty cycle indicates a percentage of the first time period at which the UE is able to transmit using a maximum transmission power configured for the UE without exceeding the threshold amount of energy for the first time period.

34. The apparatus of claim 33, wherein the threshold amount of energy is based on at least one of a radio frequency (RF) radiation exposure limit or a maximum permissible exposure (MPE).

35. The apparatus of claim 29, wherein the means for determining scheduling information based on the amount of energy is configured to at least one of:
determine at least one of an uplink schedule for transmission by the UE or a downlink schedule for reception by the UE,
determine a prioritization between a first type of traffic to be transmitted by the UE and a second type of traffic to be transmitted by the UE,
determine a prioritization between control information to be transmitted by the UE and data information to be transmitted by the UE, or
determine to switch the UE to a bearer associated with a second network that is different from the first network.

36. The apparatus of claim 29, wherein the first network comprises a millimeter wave (mmW) radio access network (RAN).

37. An apparatus for wireless communication by a user equipment (UE), the apparatus comprising:
a memory; and
at least one processor coupled to the memory and configured to:
determine an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
send, to a base station, information indicating the determined amount of energy; and
receive, from the base station, scheduling information based on the information indicating the determined amount of energy.

38. The apparatus of claim 37, wherein the information indicating the determined amount of energy comprises an energy headroom report that indicates the determined amount of energy over the first time period.

39. The apparatus of claim 38, wherein the energy headroom report is included in a power headroom report (PHR).

40. The apparatus of claim 37, wherein the determined amount of energy comprises at least one of a number of watts times a number of symbols, a number of watts times a number of seconds, a number of joules times a number of symbols, a number of joules times a number of seconds, or a number of joules.

41. The apparatus of claim 37, wherein the information indicating the determined amount of energy comprises a power headroom and a duty cycle, wherein the duty cycle indicates a percentage of the first time period at which the UE is able to transmit using a reported maximum transmission power for the UE without exceeding the threshold amount of energy for the first time period.

42. The apparatus of claim 37, wherein the sending the information indicating the determined amount of energy is based on at least one of a period of time, a pathloss change that satisfies a pathloss change threshold, or comparison of the determined amount of energy to a threshold.

43. The apparatus of claim 37, wherein the amount of energy with which the UE is able to transmit in the first network is based on the remaining amount of energy with which the UE is able to transmit over the first time period without exceeding the threshold amount of energy for the first time period or based on remaining temperatures that are to be reached prior to exceeding a thermal budget threshold associated with transmission by the UE over the first time period.

44. The apparatus of claim 43, wherein the threshold amount of energy is based on at least one of a radio frequency (RF) radiation exposure limit or a maximum permissible exposure (MPE).

45. The apparatus of claim 37, wherein the scheduling information comprises one or more of information indicating at least one of uplink scheduling or downlink scheduling associated with the UE, information indicating that a first type of data is to be prioritized over a second type of data for transmission by the UE, information indicating that control information is to be prioritized over data information for transmission by the UE, or information indicating that the UE is to switch to a bearer associated with a Long Term Evolution (LTE) radio access network (RAN).

46. The apparatus of claim 37, wherein the first network comprises a millimeter wave (mmW) radio access network (RAN).

47. An apparatus for wireless communication by a base station, the apparatus comprising:
a memory; and
at least one processor coupled to the memory and configured to:
receive, from a user equipment (UE), information indicating an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
determine scheduling information based on the information indicating the amount of energy with which the UE is able to transmit in the first network, the scheduling information to prevent the UE from exceeding the threshold amount of energy for the first time period; and
send, to the UE, information indicating the scheduling information.

48. The apparatus of claim 47, wherein the information indicating the amount of energy comprises an energy headroom report that indicates the determined amount of energy over the first time period.

49. The apparatus of claim 48, wherein the energy headroom report is included in a power headroom report (PHR) received from the UE.

50. The apparatus of claim 47, wherein the determined amount of energy comprises at least one of a number of watts times a number of symbols, a number of watts times a number of seconds, a number of joules times a number of symbols, a number of joules times a number of seconds, or a number of joules.

51. The apparatus of claim 47, wherein the information indicating the amount of energy comprises a power headroom and a duty cycle, wherein the duty cycle indicates a percentage of the first time period at which the UE is able to transmit using a maximum transmission power configured for the UE without exceeding the threshold amount of energy for the first time period.

52. The apparatus of claim 51, wherein the threshold amount of energy is based on at least one of a radio frequency (RF) radiation exposure limit or a maximum permissible exposure (MPE).

53. The apparatus of claim 47, wherein the determination of scheduling information based on the amount of energy comprises at least one of to:
determine at least one of an uplink schedule for transmission by the UE or a downlink schedule for reception by the UE,
determine a prioritization between a first type of traffic to be transmitted by the UE and a second type of traffic to be transmitted by the UE,
determine a prioritization between control information to be transmitted by the UE and data information to be transmitted by the UE, or
determine to switch the UE to a bearer associated with a second network that is different from the first network.

54. The apparatus of claim 47, wherein the first network comprises a millimeter wave (mmW) radio access network (RAN).

55. A computer-readable medium storing computer-executable code for wireless communication by a user equipment (UE), the code when executed by a processor cause the processor to:
determine an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
send, to a base station, information indicating the determined amount of energy; and
receive, from the base station, scheduling information based on the information indicating the determined amount of energy.

56. A computer-readable medium storing computer-executable code for wireless communication by a base station, the code when executed by a processor cause the processor to:
receive, from a user equipment (UE), information indicating an amount of energy with which the UE is able to transmit in a first network over a first time period, the amount of energy being based on a remaining amount of energy that is a difference between an amount of energy already generated by transmissions within the first time period subtracted from an amount of energy corresponding to a threshold amount of energy for the first time period;
determine scheduling information based on the information indicating the amount of energy with which the UE is able to transmit in the first network, the scheduling information to prevent the UE from exceeding the threshold amount of energy for the first time period; and
send, to the UE, information indicating the scheduling information.

* * * * *